US009594755B2

(12) United States Patent
Majidian

(10) Patent No.: US 9,594,755 B2
(45) Date of Patent: Mar. 14, 2017

(54) ELECTRONIC DOCUMENT REPOSITORY SYSTEM

(75) Inventor: Andrei Majidian, Ipswich (GB)

(73) Assignee: British Telecommunications PLC, London (GB)

(*) Notice: Subject to any disclaimer, the term of this patent is extended or adjusted under 35 U.S.C. 154(b) by 497 days.

(21) Appl. No.: 13/813,302

(22) PCT Filed: Jul. 29, 2011

(86) PCT No.: PCT/GB2011/001151
§ 371 (c)(1),
(2), (4) Date: Jan. 30, 2013

(87) PCT Pub. No.: WO2012/013938
PCT Pub. Date: Feb. 2, 2012

(65) Prior Publication Data
US 2013/0132389 A1    May 23, 2013

(30) Foreign Application Priority Data
Jul. 30, 2010  (EP) .................................. 10251363

(51) Int. Cl.
*G06F 7/00*  (2006.01)
*G06F 17/30*  (2006.01)
(52) U.S. Cl.
CPC .. *G06F 17/30011* (2013.01); *G06F 17/30622* (2013.01)
(58) Field of Classification Search
CPC ................ G06F 17/30722; G06F 17/30734
USPC ........................................................ 707/736
See application file for complete search history.

(56) References Cited

U.S. PATENT DOCUMENTS

| 2005/0198060 A1* | 9/2005 | Imaki et al. ............... 707/102 |
| 2006/0212470 A1* | 9/2006 | Zhang ........................ 707/102 |
| 2007/0038450 A1* | 2/2007 | Josifovski .................. 704/255 |

(Continued)

FOREIGN PATENT DOCUMENTS

| EP | 0 938 053 | 8/1999 |
| WO | WO 03/081456 | 10/2003 |
| WO | WO 2004/070624 | 8/2004 |

OTHER PUBLICATIONS

Hu et al., A Lattice Metric for Evaluating Ontology Hierarchies, Machine Learning and Cybernetics, pp. 3880-3883, 2007.*

(Continued)

*Primary Examiner* — Cheyne D Ly
(74) *Attorney, Agent, or Firm* — Nixon & Vanderhye PC

(57) ABSTRACT

An electronic document repository system comprises a storage arrangement (30-36) for storing a plurality of electronic documents; tagging means (132) for permitting users of the repository to apply tags to the documents; automatic tag processing means (134) for generating a lattice representation and assigning stored documents to nodes of the lattice representation based upon the tags applied to the documents; wherein, the repository further comprises a lattice representation difference determiner (138) which is operable to compare two lattice representations of the type generated by the automatic tag processing means (134) and to generate a difference value indicating an extent by which the compared lattice representations differ from one another according to an edit distance measure.

16 Claims, 9 Drawing Sheets

(56) References Cited

U.S. PATENT DOCUMENTS

2009/0125977 A1* 5/2009 Chander .................. G06F 8/36
  726/1
2011/0066908 A1* 3/2011 Bartz .................. G06F 11/0709
  714/746

OTHER PUBLICATIONS

Zhang et al., A Computing Model for Concept Fusing and Document Classification, Proceedings of the Second International Conference on Semantics, Knowledge, and Grid (SKG'06), pp. 1-6, 2006.*
Ceravolo et al., Bottom-Up Extraction and Trust-Based Refinement of Ontoloty Metadata, IEEE Transactions on Knowledge Data Engineering, vol. 19, No. 2, Feb. 2007, pp. 149-163.*
International Search Report for PCT/GB2011/001151, mailed Sep. 14, 2011.
He Hu et al., "A Lattice Metric for Evaluating Ontology Hierarchies", Machine Learning and Cybernetics, (Aug. 1, 2007), pp. 3880-3883.

* cited by examiner

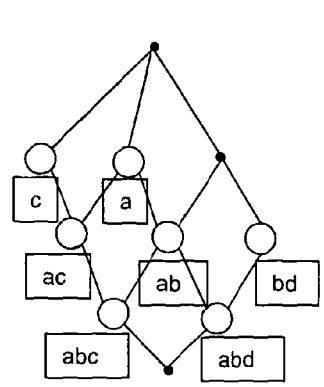
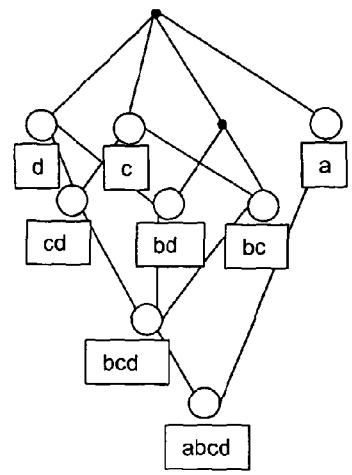
Figure 6a                                Figure 6b
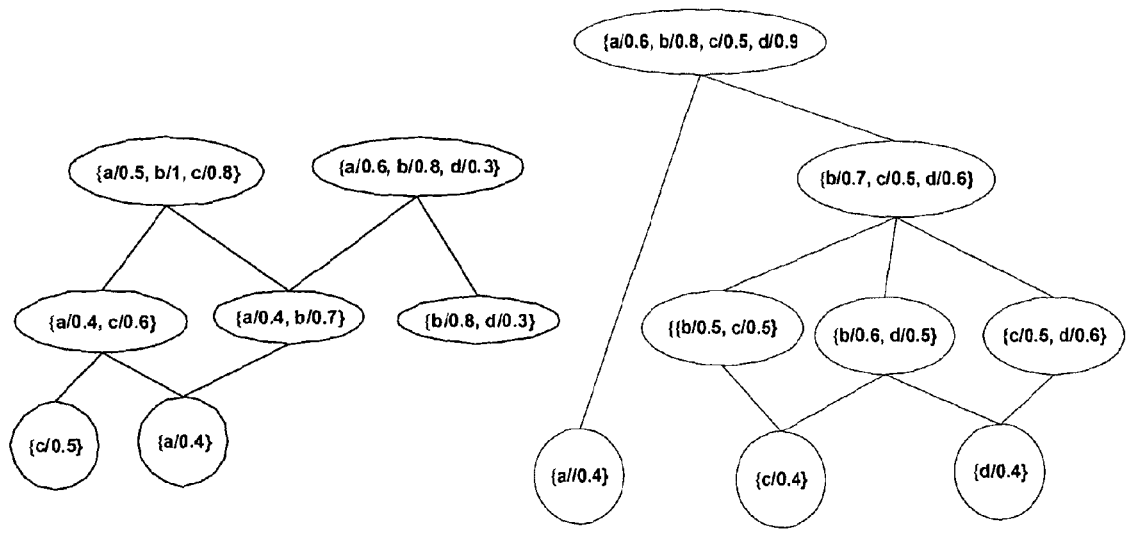
Figure 7a                                Figure 7b

ELECTRONIC DOCUMENT REPOSITORY SYSTEM

This application is the U.S. national phase of International Application No. PCT/GB2011/001151, filed 29 Jul. 2011, which designated the U.S. and claims priority to EP Application No. 10251363.7, filed 30 Jul. 2010, the entire contents of each of which are hereby incorporated by reference.

TECHNICAL FIELD

The present invention in certain example embodiments relates to an electronic document repository system and in particular, to such a system including an improved mechanism for automatically categorizing such documents and for permitting ease of searching and navigating, through the documents contained in the repository, by users. The general field of electronic document repositories and techniques for managing such repositories may be referred to as the field of knowledge management.

BACKGROUND AND SUMMARY

One aspect of knowledge management is knowledge re-use and sharing—the ability to find knowledge contained within an organization (or indeed a larger structure—e.g. the ability to find information available over the World Wide Web (WWW), to avoid needless duplication of effort. A key part of knowledge re-use and sharing is the organization of information objects or electronic documents (e.g. Word documents, Intranet pages, PowerPoint slide sets) so that objects relevant to the user's current information needs can be more easily retrieved. This is often done by means of a taxonomy or ontology. A taxonomy or an ontology may be considered as a hierarchical set of categories into which information objects may be classified, making it easier for the user to find those documents relevant to a particular query. Such taxonomies and ontologies are typically based on formal mathematical languages, allowing reasoning over the knowledge structure and an unambiguous, machine-processable representation of information.

Recently, trends towards less formal, massively collaborative, lightweight Web 2.0 tools (such as flickr and del.i-cio.us) have started to attract increasing attention from the enterprise world. In these schemes, in contrast to the conventional taxonomic/ontological approach, users are not required to classify information objects against a pre-defined corporate knowledge organization scheme but instead are free to define their own topics to associate with information objects (such topics are known as 'tags'). Where multiple users tag a set of information objects, a folksonomy emerges. A folksonomy can thus be defined as a system of classification derived from the practice and method of collaboratively creating and managing tags to annotate and categorize content.

The advantage of informal collaborative tagging of information objects is that experience shows that users find it a very natural and low-cost (i.e. easy and convenient) way to categorize information. Typical enterprise knowledge management systems are based on repositories where information is stored and classified against a pre-defined classification scheme (taxonomy or ontology) for later retrieval. Whilst useful, such systems can be time-consuming to use, since they require knowledge of the classification scheme. Furthermore, such formal, centralized systems tend to be changed only slowly and not in a way which is representative of the often fast-moving changes in conceptualization that users may have of a domain as new concepts emerge and as the relationships between existing concepts shift. Often, therefore, the formal knowledge structure ceases to be fit for purpose since its categorization scheme becomes outdated and no longer in tune with the user community's view of the domain.

The disadvantage of the folksonomic approach is that the benefits of the ontological or taxonomic approach are lost. These include the ability to perform ontological reasoning over the information objects and the inherently shared nature of the more formal approach: whereas in the formal approach a single category will be used to represent a given concept, in the tagging approach users are free to use whatever tags they wish and may use multiple tags to represent essentially the same concept. Furthermore, the hierarchical structure of a taxonomy or ontology will be lost. The hierarchical structure may be useful both for performing formal automated reasoning to enhance the operation of a search engine, and generally just to help a user conceptualize the repository as a whole and various "routes" through the repository to assist the user in "navigating" through the repository.

An approach has been developed for generating ontologies using a bottom-up approach involving automatically processing a set of documents. This approach is based on founding work by Rudolph Wille and his former student Bernhard Canter concerning Formal Concept Analysis (FCA). FCA may be described as a principled way of automatically deriving an ontology from a collection of objects and their properties. For example, a paper by Paolo Ceravolo et al. Entitled "Bottom-Up Extraction and Trust-Based Refinement of Ontology Metadata" describes an approach for automatically processing XML documents (or "objects") and deriving from these hierarchical information which is combined with an "upper ontology" to generate an enhanced ontology. Feedback from users is then used to ascertain the correctness of the automatically generated ontology, using a sort of trust score assigned by users to the decisions made by the automatic tool. (N.B. the above discussed paper by Ceravolo et al. uses the term "tag" in a non-standard way to refer to non-leaf nodes within a tree representation of an XML document—in the present document the term tag is used in a more standard manner to refer to a classification term assigned to an electronic document by a user.)

SUMMARY OF THE INVENTION

Preferably the automatic tag processing means is operable to assign, in respect of each tagged electronic document, a fuzzy membership value to each term with which the respective document has been tagged (i.e. for each tag applied to a document in simple systems where each tag comprises just a single term). Furthermore, the automatic tag processing means is preferably further operable to use a formal concept analysis approach to generate a lattice representation based on the fuzzy membership values assigned to the electronic documents.

Note that the term electronic document is intended to be interpreted widely as covering any kind of resource which is storable and or accessible over a computer network and which is sufficiently identifiable as to permit a user to apply a tag to it—non-exclusive examples would include data files such as text files, picture files, audio files and video files, relational databases, computerized services, web sites, etc.

The present invention in certain example embodiments can therefore be used to take a folksonomy and extract a more formal knowledge structure from it, thus retaining the low barrier to entry of the tag-based approach while gaining some of the benefits set out above of the more formal approach.

In short, the approach can deliver easier sharing and reuse of knowledge by combining informal and formal techniques at the intersection of Web 2.0 and semantic technologies. It can capitalize on the advantages of both socially-driven folksonomies and expressive Semantic Web ontologies, by which knowledge about a domain of interest can be represented in an unambiguous, machine-interpretable way.

Preferably, the repository is operable to generate a new lattice representation from the tagged documents in the repository on a periodic basis (e.g. after a certain predetermined number of tags have been applied to documents contained in the repository) and to ascertain the amount of drift of the lattice between each iteration, and wherein it is further operable to perform an action in the event that the drift between lattices from one iteration to the next exceeds some threshold criterion.

For example, in a first mode of operation, the repository could initially wait before attempting to generate an ontology based on the lattice representation generated by the automatic tag processing means until such time as the drift between iterations is detected as being below a predetermined threshold amount. In this way, no effort is made to generate an ontology until the lattice has stabilized sufficiently that the level of tagging has reached a relatively stable state of affairs. Thereafter, the repository could move to operate in a second mode of operation in which the drift continues to be monitored, but no action is taken until such time as the drift (either between iterations, or between the current iteration and some reference lattice such as the lattice at the time that the first mode of operation was completed, or a lattice generated from the ontology currently employed by the repository, etc.) exceeds some predetermined threshold amount, at which point it is decided that the ontology may need updating, in which case either a new ontology could be automatically generated based on the lattice generated in the most recent iteration, or a human expert could be notified in order to perform a manual editing of the ontology used by the repository based on the lattice representation generated in the current iteration, etc.

Preferably, the lattice representation difference determiner comprises an edit distance means for determining an edit distance between each node in the first lattice and each node in the second lattice (the first and second lattices referring arbitrarily to the two lattices being compared—i.e. it doesn't matter which of the two lattices is the "first" lattice and which is the "second"—also note that if the lattices are different sizes—i.e. having a different number of nodes—then the smaller lattice is expanded with empty nodes containing zero documents/members so that it becomes the same size as the larger lattice); preferably, the edit distance is based on the documents assigned to each node and, most preferably, also based on a subset of the membership values, associated with the members assigned to that node.

Preferably, the subset of membership values assigned to a node in the lattice is given by the membership values assigned to a document/member which are equal to or less than the minimum membership value assigned to the document/member in respect of an attribute/tag associated with the node in question. (For example, if a member A (e.g. a Document A) has been assigned membership values of 0.3, 0.5 and 0.7 to attributes (e.g. tags) x, y and z respectively, any node to which x has been assigned (e.g. a node to which x, y and z have been assigned, a node to which x and y (but not z) have been assigned, a node to which x and z (but not y) have been assigned and a node to which x (but not y or z) has been assigned) would have member A assigned to it with an associated membership value of 0.3; similarly, any node having y but not x assigned to it (e.g. a node having y and z but not x or having y but not x or z) would have member A assigned to it appearing twice in the list of assigned members, once with a membership value of 0.3 and once with a membership value of 0.5, finally, any node having z but not x and not y assigned to it would feature member A appearing three times in the list of assigned members, once with a membership of 0.3, once with a membership of 0.5 and once with a membership of 0.7.)

Preferably, the lattice representation difference determiner further comprises an assigner module for identifying pairings between each node in the first lattice to a corresponding node in the second lattice so as to minimize the total edit distance associated with a transformation from the first (or source) lattice to the second (or target) lattice. Preferably, the assigner module operates in accordance with an implementation of the Hungarian assignment algorithm.

The repository system of preferred embodiments of the present invention provides an effective way for generating an ontology or hierarchical classification scheme or taxonomy for documents contained in the repository which effectively utilizes the skills of human users to assist in the classification in a way which minimizes the cost (i.e. effort) to those users (they simply need to perform tagging). The components of a fuzzy lattice former and a fuzzy lattice difference determiner combine with the tagging in such a way as to be able to generate the ontology automatically as well as to monitor the changes to the ontology implied by changes in the tagging behavior of the users. The ontology generator and the lattice difference determiner which are able to cope with fuzzy lattices are particularly important and operate in a particularly synergistic manner to enable the efficient operation of the system as a whole.

The present invention in certain example embodiments also contemplates other inventive uses of a fuzzy lattice builder and fuzzy lattice difference determiner. For example, according to a second aspect of the present invention, there is provided a database system comprising: a database module, operable to store data in a set of tables of data; a fuzzy lattice generation means operable to convert a table of data contained in the database module into a fuzzy lattice representation of the data (possibly based on an input membership function or functions); and a fuzzy lattice difference determiner which is operable to determine the difference between two tables contained in the database module (most preferably the two tables being compared being the same table at different times, where the table is updated over time to reflect changing contents). The resulting identified difference can then be used in order to trigger some action if the identified difference exceeds some predetermined threshold.

According to a third aspect of the present invention there is provided an electronic document repository comprising: a distributed storage arrangement (e.g. a set of web servers or database servers) for storing a plurality of electronic documents; tagging means for permitting users of the repository to apply tags to the documents (the tags may be stored with the documents to which they refer or they may be stored separately in a special store for storing and processing tags), automatic tag processing means for generating a lattice representation and assigning stored documents to nodes of the lattice representation based upon the tags applied to the documents; and ontology generation means for generating an ontology from the lattice representation; wherein, the repository further comprises a lattice representation difference determiner which is operable to compare two lattice representations of the type generated by the automatic tag processing means and to generate a difference value indicating an extent by which the compared lattice representations differ from one another according to an edit distance measure, wherein the assignment of stored documents to nodes of the lattice representation is performed in dependence upon the difference between two lattices, wherein the two lattices being compared are formed by processing the tags applied to the documents at different times such that the assignment can be performed either only when the difference indicator indicates a small difference (below a threshold amount) between successively generated lattices so as to indicate that the lattice has stabilized or when the difference indicator indicates a difference above a threshold amount so as to indicate that a previously stable lattice has been modified enough to justify reclassifying documents.

Further aspects of the present invention relate to methods of storing electronic documents in an electronic document repository and methods of storing and processing data in a database system which correspond to the first and second aspects of the present invention respectively. Yet further aspects correspond to computer programs for carrying out such methods and to carrier means, preferably tangible carrier means such as magnetic or optical disks or solid state memory devices, etc., carrying such programs.

BRIEF DESCRIPTION OF THE DRAWINGS

In order that the present invention may be better understood, embodiments thereof will now be described, by way of example only, with reference to the accompanying drawings in which:

FIGS. 6a and 6b are schematic illustrations of example crisp lattices;

FIGS. 7a and 7b are schematic illustrations of example fuzzy lattices;

DETAILED DESCRIPTION OF EMBODIMENTS

Figure 1:
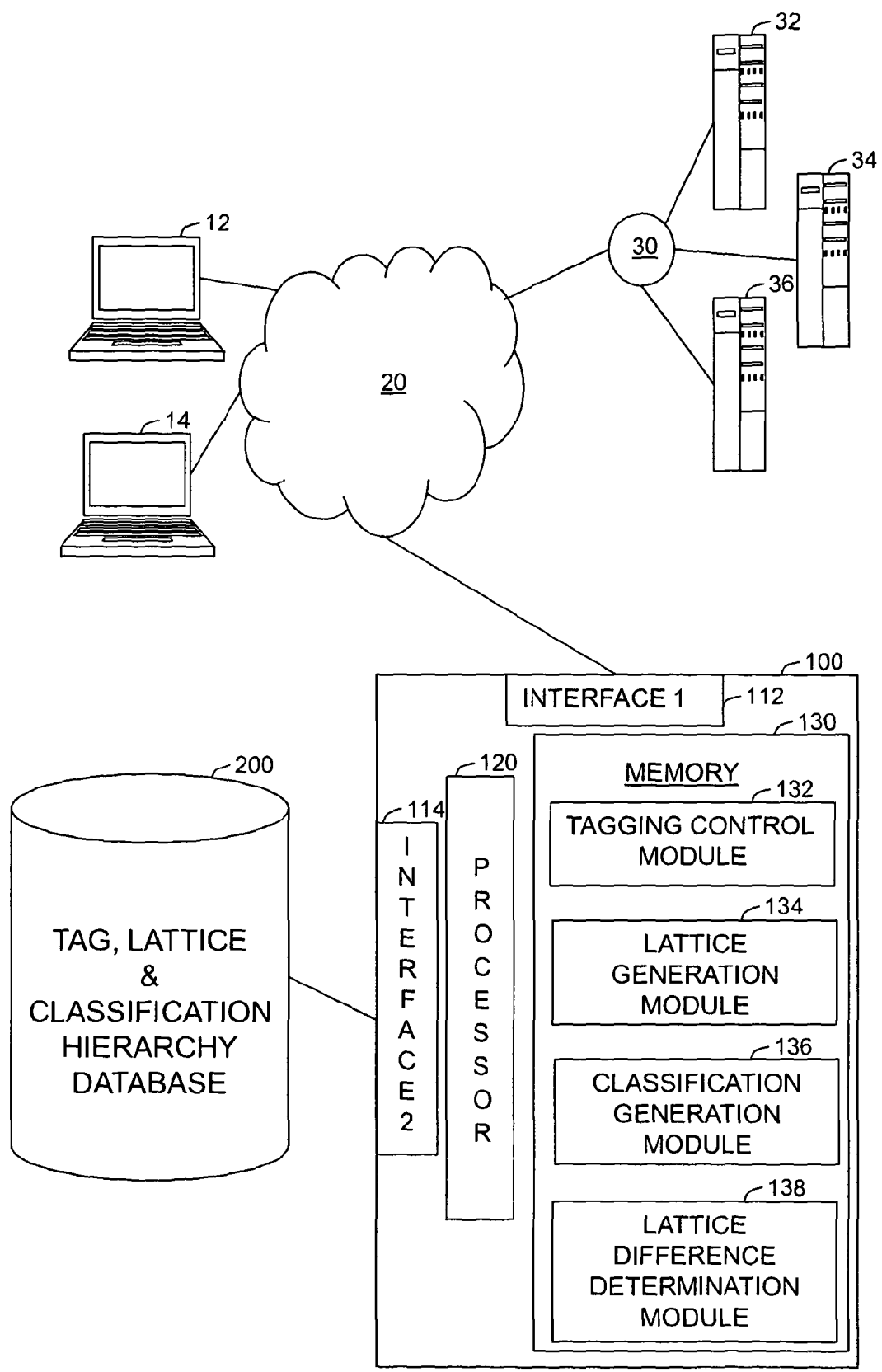
FIG. 1 is a block diagram illustrating in overview the principal components of an electronic document repository system in accordance with an embodiment of the present invention.

FIG. 1 is a schematic illustration of an electronic document repository according to a preferred embodiment of the present invention. The repository system comprises a server farm comprising a Local Area Network (LAN) 30 and a plurality of server computers 32, 34, 36 which store a plurality of electronic documents (note that the term electronic document is used to refer to a document which is not paper based, but rather is stored on a computer system and is able to be viewed by a user having a data connection to the computer system storing the document—an alternative term would be virtual document; generally such documents are stored electronically but the term electronic document is not intended to exclude similar non-electronic (e.g. optical) ways of storing representing and transmitting such documents, etc.). The server farm 30, 32, 34, 36, is connected to a Wide Area Network (WAN) which in this case is the Internet 20. Also connected to the Internet 20 are some user devices 12, 14 which in this case are laptop computers 12, 14 but could be any device which is capable of running a web browser application or something similar. Finally, also connected to the Internet 20 are a document classification system 100 and an associated Tag, Lattice and Ontology Database 200. In overview, in the present embodiment, the document classification system operates as a gateway for users who wish to view documents contained in the server farm 30-36 whilst taking advantage of classification and tagging facilities provided by the classification system 100, which facilities include the ability to tag documents, to search for documents based on tags which have been previously applied to the documents by users and to navigate through documents based on a classification hierarchy which is automatically applied by the classification system. In alternative embodiments, the classification system could additionally provide ontology enhanced searching facilities (this is discussed in greater detail at the end of this document).

The classification system 100 comprises a first interface 112 via which the system 100 is connected to the Internet 20 and a second interface 114 via which the system 100 is connected to the tag, lattice and classification hierarchy database 200. The system also includes a processor (and associated electronics) 120 and a memory 130. As is well known, the memory contains data, etc. required by the processor to operate, as well as computer program code for controlling the operation of the processor. In addition to a number of standard programs (e.g. an operating system) which are not described here since they are not pertinent to certain example embodiments of the present invention, the memory also includes the following computer program code modules which are responsible for causing the system to carry out various functions which are pertinent to certain example embodiments of the present invention. These more pertinent modules are a tagging control module 132, a lattice generation module 134, a classification generation module 136 and a lattice difference determination module 138.

The tagging control module 132 is responsible for enabling the system 100 to act as a gateway to the server farm 30-36. Thus the system 100, under the control of the tagging control module 132, is operable to receive requests for documents residing at the server farm 30-36 and to send these to a requesting user (e.g. at device 12) for viewing. In addition, once the document has been appropriately classified, the system will present to the user not just the document, but also information about its classification under the classification hierarchy and may additionally provide details of any tags which users have previously applied to the document. Additionally, the system 100, under the control of the tagging control module 132, is operable to receive requests from users to tag any of the documents presented to the user via the system 100. Any such tags entered by a user are then stored in the Tag, Lattice and classification hierarchy Database 200. (Note that in alternative embodiments, the tags could be stored in a more distributed manner, or they could be stored locally to the document to which they refer. However, in the present embodiment the tags are stored separately from the documents to which they refer and the database 200 merely stores an identifier for each document together with meta data about the document—i.e. the tags and any classification information, etc.).

The lattice generation module 134 is responsible for causing the system 100 to take tag data from the Tag, Lattice and Classification Hierarchy Database 200 and to convert this data into a lattice representation using Formal Concept Analysis (FCA) techniques. The exact way in which this is done is described in detail below after a general discussion about FCA. Having processed the tag data to generate a lattice representation, this data is then stored in the Tag, Lattice and Classification hierarchy Database 200 for future use. The system may delete old lattice representations if it deems that they are no longer necessary in order to save space in the Tag, Lattice and Classification hierarchy Database 200. This will become clearer when discussing various possible modes of operation of the system 100 below.

The classification generation module 136 is responsible for controlling the system 100 to read a lattice representation from the Tag, Lattice and Classification hierarchy Database 200 and to generate from such a representation an classification hierarchy which can then be used as a classification hierarchy for the tagged documents contained in the server farm 30-36. The process is simple to perform having created the lattice representation. In summary, each node can ascertain if it is a sub-node of any other node either by checking to see if every member of a first node is contained in the members of a second node in which case the first node is a sub-node of the second node, or by checking to see if the attributes of a second node are included amongst the attributes of a first node, in which case the first node is a sub-node of the second node. With this test (which can be expressed mathematically as is done in the section below entitled Formal Concept Analysis), it is possible to determine an ordering of the nodes in the lattice, and this can then be used to form a classification hierarchy by associating each node of the lattice with a corresponding classification heading and using the same ordering of the classification headings to form a mirroring hierarchy to that of the lattice (such that a heading associated with a sub-node in the lattice becomes a sub-heading in the classification scheme under the heading corresponding to the node to which the sub-node is subordinate, etc.).

The lattice difference determination module 138 is responsible for controlling the system 100 to determine a difference between two lattices. The precise operation of this module is discussed in greater detail below. However, in overview, the lattice difference determination module operates by firstly determining an edit distance (see below) between each concept in one lattice (the source lattice for example) and every other concept in the other lattice (e.g. the target lattice). Then an algorithm (see below) is employed to determine a good way in which to pair concepts between one lattice and the other such that the total cumulative edit distance between the lattices obtained by summing together the individual edit distances of each pairing is minimized. The total edit distance between the lattices determined in this way is then generated as the output of the lattice difference determination module 138.

First Mode of Operation

Figure 2:
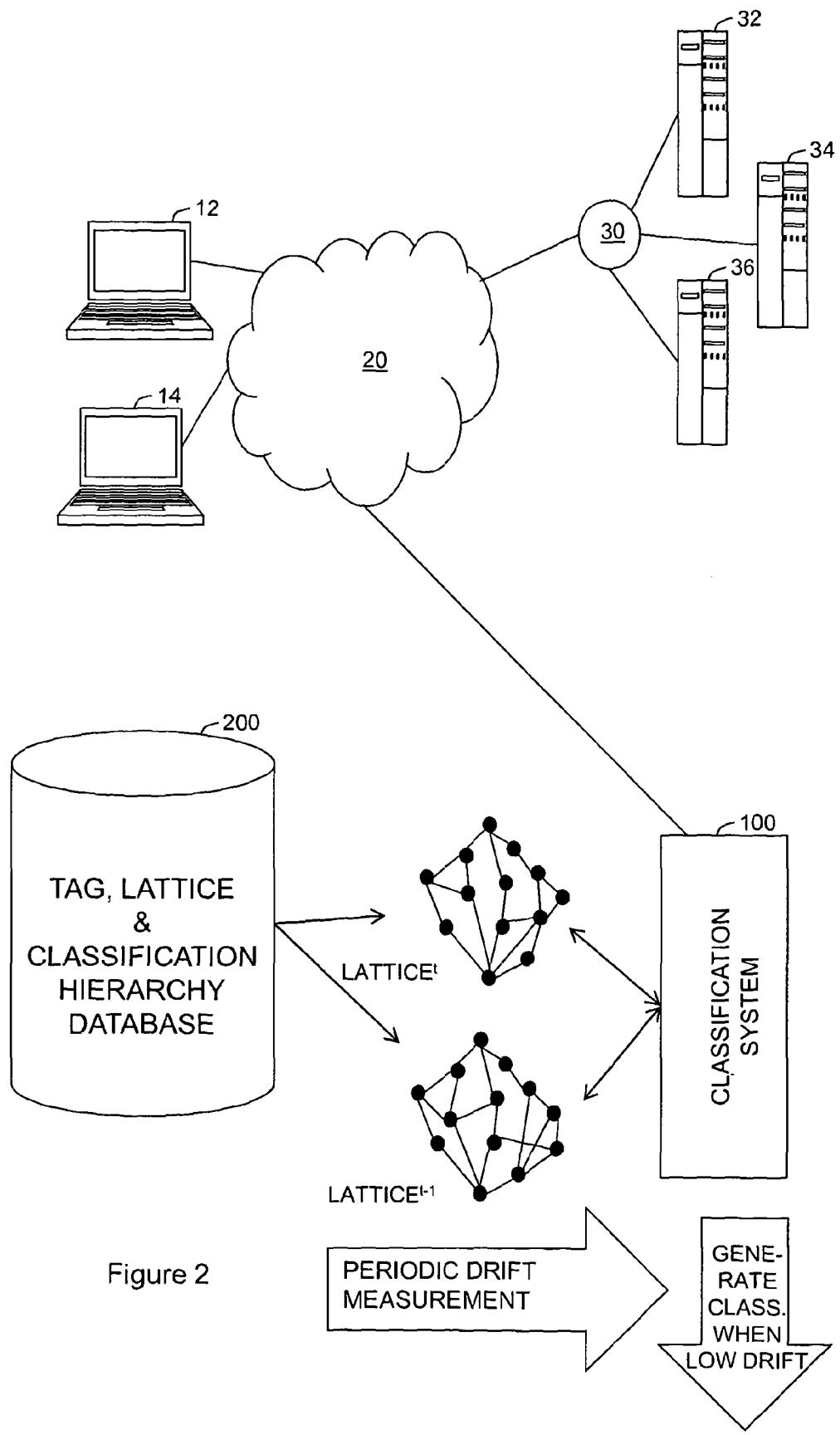
FIG. 2 is a schematic diagram illustrating the system of FIG. 1 operating in accordance with a first mode of operation of the system.

FIG. 2 illustrates a first mode of operation of the system of FIG. 1. Like reference numerals have been used to indicate like elements. This mode of operation is used in the present embodiment when a new batch of documents is to be classified. In this mode of operation the system waits until an initial threshold number of tags have been applied to the documents. It then creates a first source lattice from the tags which have been applied and then continues to collect tags applied by users of the system until a first iteration threshold number of further tags have been applied to the documents. At this time a first target lattice is formed from the new collection of tags (including the tags used to generate the first source lattice). The difference between the source and target lattices is then calculated using the classification system 100. If the difference is below some threshold drift amount, then the lattice is considered to be stable, otherwise the system continues to collect more tags and at each iteration looks to see how much the lattice has changed between iterations until the lattice finally shows a difference between iterations which is below the threshold difference amount at which point the system determines that the lattice is stable and a classification hierarchy is generated based on the stable lattice and the documents are assigned to classification headings corresponding to their appearances in the concepts associated with the lattice.

Figure 3:
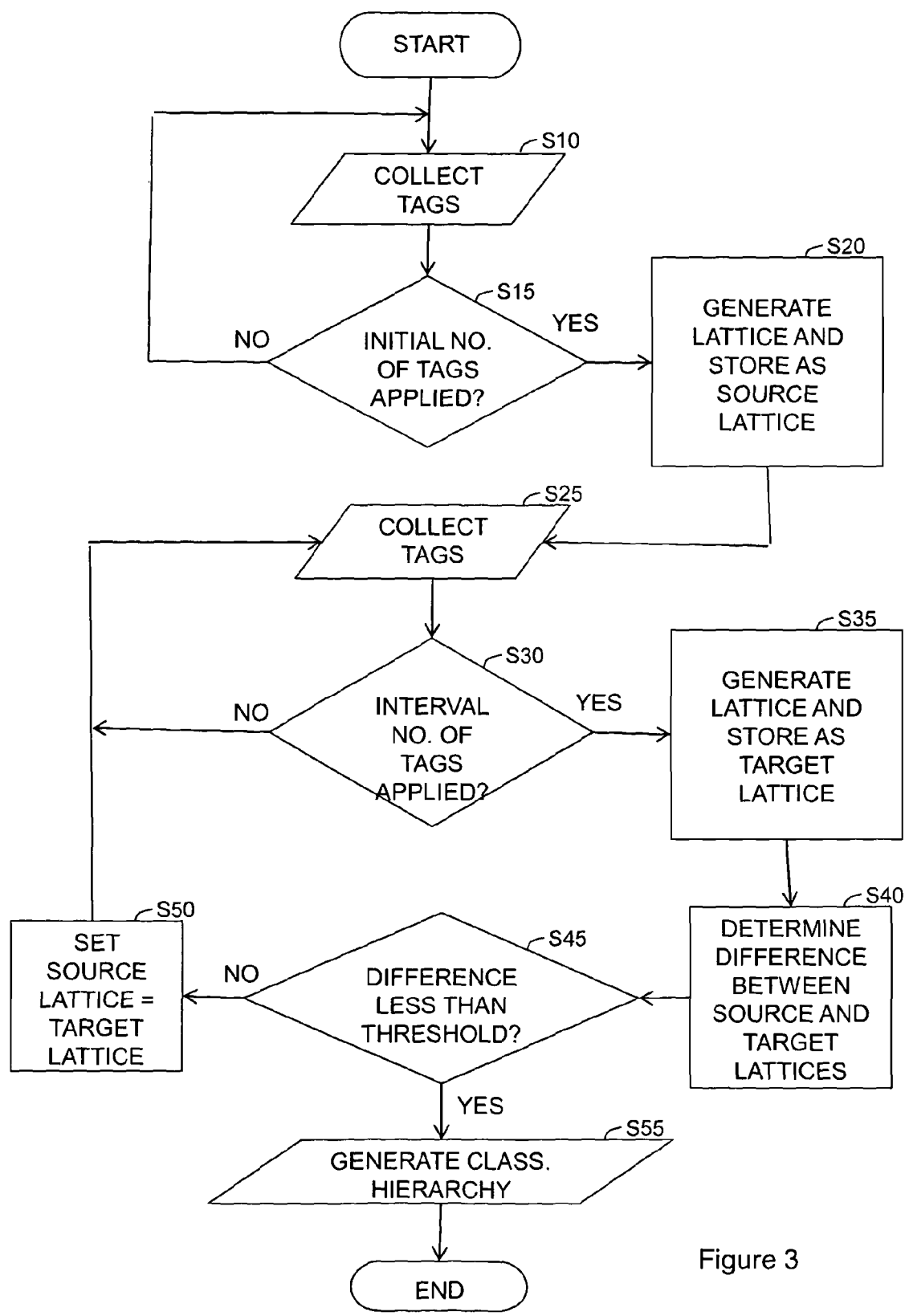
FIG. 3 is a flowchart illustrating the steps performed by the system of FIG. 1 when operating in accordance with the first mode of operation of the system.

FIG. 3 illustrates in greater detail, the steps performed by the system of FIG. 1 when operating in the first mode of operation. After the method commences, the method proceeds to step S10 in which the system collects tags (which are stored in the tag database 200). At step S15 the system determines if enough tags have been applied to meet a predetermined initial number of tags requirement. If not, the method loops back to step S10 and collects more tags. Once it is determined in step S15 that enough tags have been applied to the documents, the method proceeds to step S20 in which a lattice is generated based on the tags and this lattice is stored in the lattice database 200 as a source lattice.

Upon completion of step S20 the method proceeds to step S25 in which the system again continues to collect tags applied to the documents by users. When it is determined in step S30 that a sufficient interval number of tags have been applied since the time when the stored source lattice was generated, the method proceeds to step S35, otherwise the method loops back to step S25 to collect more tags. At step S35 a new lattice is generated from the current collection of tag data and the new lattice is stored as a target lattice. The method then proceeds to step S40 in which a difference between the stored source and target lattices is calculated.

The method then proceeds to step S45 in which it is determined if the difference is less than a threshold difference between the source and target lattices. If not, then the method proceeds to step S50 in which the new source lattice is set to be equal to the current target lattice and then the method loops back to step S25 in order to collect more tags as part of a new iteration.

If at step S45 it is determined that the difference between the source and target lattices (i.e. the extent to which the lattice has changed during one iteration—i.e. since the last n tags were added where n equals the interval number of tags which must be applied between iterations before the method proceeds from step S30 to step S35) is less than the threshold (which can be thought of as a stability threshold), then the method proceeds to step S55 in which a class hierarchy is generated and applied to the documents which have been tagged.

Second Mode of Operation

Figure 4:
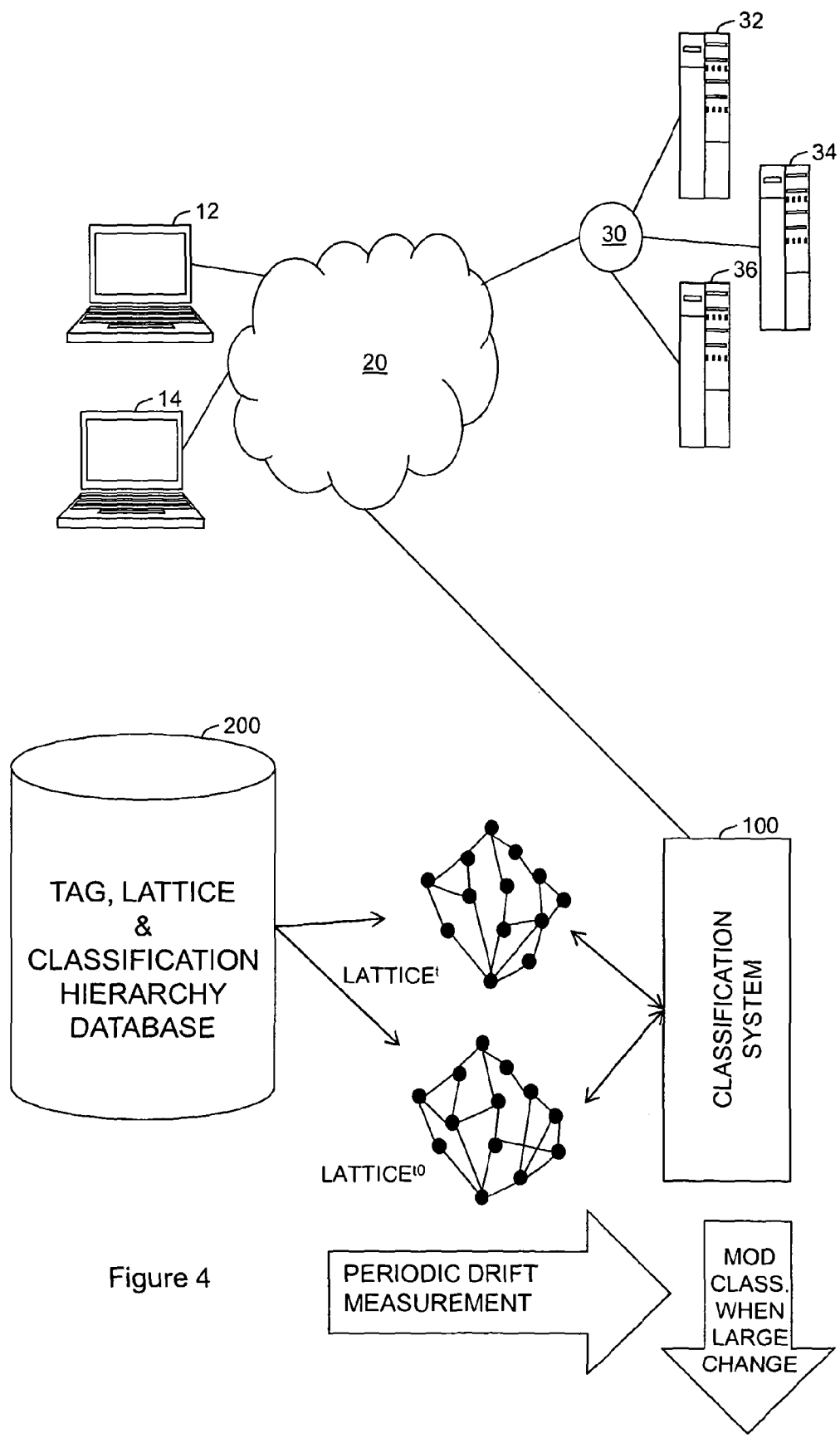
FIG. 4 is a schematic diagram illustrating the system of FIG. 1 operating in accordance with a second mode of operation of the system.

FIG. 4 illustrates the system of FIG. 1 operating in accordance with a second mode of operation. In the present embodiment, the system operates firstly in the first mode of operation in order to await a time where the lattice derived from the tag data has stabilized somewhat. At that point a classification hierarchy is generated and applied to the documents for use by the system to assist users in navigating through the collection of documents. In order to avoid moving the documents around constantly thereafter, the system moves into a second mode of operation in which the system tracks how much the nature of the tagging has changed since the time that the classification was decided upon. Only when the lattice generated by the system based on the current set of tags differs from the lattice upon which the classification was originally based by more than a threshold amount, does the system determine that the classification system should be modified. In the present embodiment, this is done automatically. However, in alternative embodiments, rather than automatically generating a new classification hierarchy based on the lattice, the system could alert a human operator to the fact that the lattice has changed significantly from a reference lattice which reflects the classification system applied to the documents in the repository, and the human operator could look to see how the classification system might be amended based on the current tagging. In such an embodiment, it might be the case that a human operator may have had a hand in creating the original classification hierarchy generated after the completion of the first mode of operation of the system.

Thus, in FIG. 4 it can be seen that the tag, lattice and classification hierarchy database 200 stores a reference lattice (LATTICE$^{r0}$) which is repeatedly compared against a current lattice (LATTICE$^{r}$) which is periodically calculated (e.g. based on an interval number of tags having been applied to the documents in the repository as before— although a time based period could be used instead) until the difference between these exceeds some threshold difference whereupon the classification hierarchy is modified to reflect the changes and the documents in the repository are re-classified according to the modified classification hierarchy.

Figure 5:
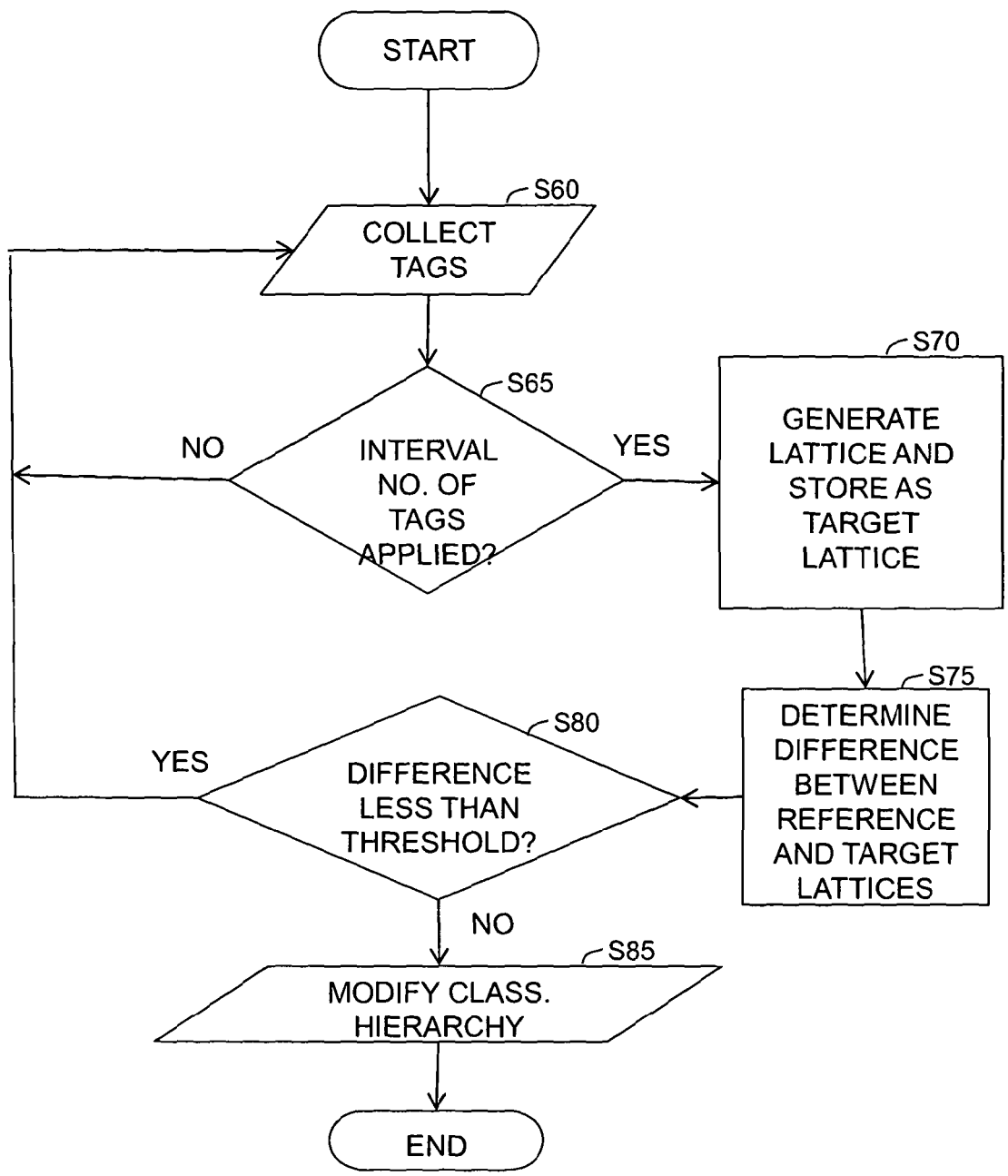
FIG. 5 is a flowchart illustrating the steps performed by the system of FIG. 1 when operating in accordance with the second mode of operation of the system.

FIG. 5 presents the steps performed by the system in order to operate in the second mode of operation in more detail. After the method commences, the method proceeds to step S60 in which the system collects tags (which are stored in the tag database 200). At step S65 the system determines if enough tags have been applied to meet a predetermined interval number of tags requirement. If not, the method loops back to step S60 and collects more tags. Once it is determined in step S65 that enough tags have been applied to the documents, the method proceeds to step S70 in which a lattice is generated based on the tags and this lattice is stored in the lattice database 200 as a target lattice.

Upon completion of step S70, the method proceeds to step S75 in which a difference between the target lattice and a stored reference lattice is calculated. In the present embodiment, the reference lattice is the lattice which is generated by the system upon completion of the first mode of operation of the system before it moves into operation in the second mode of operation.

The method then proceeds to step S80 in which it is determined if the difference is less than a threshold difference between the source and target lattices. If it is, then the method loops back to step S60 to commence another iteration of collecting tags and looking to see after enough tags have been collected whether or not a change needs to be made to the classification hierarchy.

If however it is determined at step S80 that the difference is not less than a threshold difference, then the method proceeds to step S85 in which then the method proceeds to step S55 in which a modified class hierarchy is generated and applied to the documents which have been tagged. As noted above, in alternative embodiments, instead of automatically reclassifying the tagged documents based on the modified hierarchy at this stage, an expert user could be notified about the proposed changes to the hierarchy and he/she could review the proposed changes prior to them actually being applied to the tagged documents, etc.

Formal Concept Analysis (FCA)

A mathematical explanation of Formal Concept Analysis can be given thus:

When data may be presented in a tabular format where the rows are labelled with members or "objects" and the columns are labelled as "attributes", the following procedure may be used to extract a set of "concepts" from the data.

Consider any subset X of object set Objects (as used to label the table rows)

Collect all common attributes, from set Attributes (as used to label the table columns), that elements of X have in common Denote this set of common attributes by I Go back to Object set and determine if there are any more objects that have all attributes in I This new object set is denoted by E The pair (E, I) forms a concept Let (X, Y) be a concept X (which comprises the set of objects sharing a common set of attributes) is called the extension of the concept while Y (which comprises the set of attributes which is shared by the set of objects, X) is referred to as the intension of the concept.

The table itself is referred to as a context. Iterating through the power set of objects, the set of all concepts in the context can be found.

Furthermore, a partial order ≤ can be defined on the set of all concepts in a context, where $$(X1,Y1) \leq (X2,Y2) \text{ means } X1 \subseteq X2 (\text{or } Y2 \subseteq Y1)$$

Hence the set of all concepts in a context form a graph which in the present application and in FCA generally is called a lattice. The partial ordering defined above is used by the classification generation module 136 to determine a classification hierarchy from the lattice generated by the lattice generation module 134. As will be described in greater detail below, the lattice generation module 134 in the present embodiment actually generates a fuzzy lattice based on fuzzy membership values used in the tabular representation of tagging data, but the ordering approach is unaffected by this additional complexity.

FCA with Fuzzy Membership

As mentioned above, in the present embodiment, the lattice generation module 134 operates to generate a fuzzy lattice where the data to be analysed is data having fuzzy membership values. In such a case, every member which has some non-zero level of membership with a set of one or more attributes is included in the concept which contains that set of attributes, however, a member may be included more than once in a given concept, and the way in which it is decided how many times a member is included in a given concept and with what membership level(s) is as set out in the following sentence. The subset of membership values associated with a member assigned to a node in the lattice is given by the membership values assigned to a member which are equal to or less than the minimum membership value assigned to the document/member in respect of an attribute/tag associated with the node in question. (For example, if a member A (e.g. a Document A) has been assigned membership values of 0.3, 0.5 and 0.7 to attributes (e.g. tags) x, y and z respectively, any node to which x has been assigned (e.g. a node to which x, y and z have been assigned, a node to which x and y (but not z) have been assigned, a node to which x and z (but not y) have been assigned and a node to which x (but not y or z) has been assigned) would have member A assigned to it with an associated membership value of 0.3; similarly, any node having y but not x assigned to it (e.g. a node having y and z but not x or having y but not x or z) would have member A assigned to it appearing twice in the list of assigned members, once with a membership value of 0.3 and once with a membership value of 0.5, finally, any node having z but not x and not y assigned to it would feature member A appearing three times in the list of assigned members, once with a membership of 0.3, once with a membership of 0.5 and once with a membership of 0.7.)

Lattice Difference Measurement

We will now discuss how the classification system 100, and in particular the lattice difference determination module 138 determines an edit distance between two lattices.

The edit distance between two sets S1 and S2 measures the number of changes (insertion, deletion, replacement) that are required to change S1 into S2. We present this edit-distance measurement in two distinct modes: initially in crisp form and subsequently in fuzzy form.

Crisp Edit-Cost

For the purposes of the present embodiment, we consider one common manner of describing an edit distance between two sets of elements which is to consider the edit distance as a tuple of values (i, d, r) representing the amount of insertion, deletion and replacement in S1 which is required to transform it to S2, with the total cost being given by i+d+r. Note that since an insertion followed by a deletion (or equivalently a deletion followed by an insertion) is equivalent to a single substitution (i.e. a single replacement—the terms substitution and replacement are equivalent), either i, d or both must be zero since otherwise the edit distance could be made smaller by replacing the overlap of insertions with deletions by the same number of substitutions/replacements.

For convenience, we define an auxiliary definition of addition $\oplus$ by the following formulation before presenting the algorithm to compute a crisp edit-distance employed in the present embodiment:

$$(i3,d3,r3)=(i1,d1,r1)\oplus(i2,d2,r3)$$

where
i3=max(0,i1+i2−d1−d2)
d3=max(0,d1+d2−i1−i2)
r3=r1+r2+max(min(i1,d2),min(i2,d1))

Thus, for example, using above definition of $\oplus$, $$(1\ 0\ 1)\oplus(0\ 2\ 1)=(0\ 1\ 3)$$

Example

S1=<a, b, c>, S2=<b, d> requires two changes—replace a by d, delete c (equivalently, replace c by d, delete a). The edit cost is (0 1 1), total cost=2

Note this is not a symmetric operation—changing S2 to S1 is not the same as changing S1 to S2 (although there is a relation between the edit costs—generally the total edit cost i3+d3+r3 will be the same regardless of the order).

To calculate the edit cost we use the elements of S1 and S2 to label rows and columns of a table (NB the elements must be listed in a fixed order). The value of each cell (i,j) in the table is the minimum cost to transform S1(i) to S2(j), where S1(i) is the subset of S1 comprising the first i elements of S1 and similarly for S2(j).

The algorithm for calculating Levenshtein distance can be used here, but keeping costs as (i, d, r) not as total cost, and using the special definition for addition $\oplus$ as described above.

Consider the following example:

TABLE 1

|   | 0 0 0 | b<br>1 0 0 | d<br>2 0 0 |
|---|---|---|---|
| a | 0 1 0 | | |
| b | 0 2 0 | | |
| c | 0 3 0 | | |

Label rows, columns, fill in costs compared to null set (row zero, column zero)
//Start at top left,
repeat
Select an empty cell (i, j) where costs are known for cells (i−1, j), (i, j−1), (i−1,j−1)
if row label=column label, cost $C(i,j)=\min[C(i-1,j-1),C(i-1,j)\oplus(0\ 1\ 0),C(i,j-1)\oplus(1\ 0\ 0)]$ if row label≠column label cost $C(i,j)=\min [C(i-1,j-1)\oplus(0\ 0\ 1),C(i-1,j)\oplus(0\ 1\ 0),C(i,j-1)\oplus(1\ 0\ 0)]$ until the bottom right cell of the table reached Wherein, in order to find min( ), the total costs for each cell/tuple are compared.

Following this algorithm, the table is filled in as below:

TABLE 2

|   | 0 0 0 | b<br>1 0 0 | d<br>2 0 0 |
|---|---|---|---|
| a | 0 1 0 | 0 0 1 | |
| b | 0 2 0 | | |
| c | 0 3 0 | | |

TABLE 3

|   | 0 0 0 | b<br>1 0 0 | d<br>2 0 0 |
|---|---|---|---|
| a | 0 1 0 | 0 0 1 | 1 0 1 |
| b | 0 2 0 | | |
| c | 0 3 0 | | |

TABLE 4

|   | 0 0 0 | b<br>1 0 0 | d<br>2 0 0 |
|---|---|---|---|
| a | 0 1 0 | 0 0 1 | 1 0 1 |
| b | 0 2 0 | 0 1 0 | 0 0 1 |
| c | 0 3 0 | 0 2 0 | 0 1 1 |

The edit distance is the value in the bottom right cell of the table i.e. (0 1 1), or one deletion and one replacement. Note that we have added a first column with no label and a first row with no label so that it is always possible to fill in the values for the first row and column without any decisions needing to be made (the first row has values (0 0 0), (1 0 0), (2 0 0), (3 0 0), . . . whilst the first column has values (0 0 0), (0 1 0), (0 2 0), (0 3 0), . . . . Also note that when determining a value for the (b,b) cell (i.e. column label "b"=row label "b") we have used the cost in cell (a,) (i.e. row label "a", column label " " (i.e. no label))=cell (i−1, j−1) since this has a total cost of 0+1+0=1 whereas the other options of cell (i−1,j)⊕(0 1 0)=(0 0 1)⊕(0 1 0)=(0 1 1) has a total cost of 0+1+1=2 and similarly cell (i,j−1)⊕(1 0 0)=(0 2 0)⊕(1 0 0)=(0 1 1) also thus with a total cost of 2.

Lattice Edit-Cost

In the second part of the operation performed by the lattice difference determination module 138, by application of an assignment algorithm (which is basically a form of the Hungarian/Munkres assignment algorithm) a method is used for finding the edit cost for two concept lattices. The method of the present embodiment works with the concept extensions (i.e. the members of a concept, as opposed to the common attributes shared by those members—see the discussion of formal concept analysis in the section with this sub-title given above), and one lattice is denoted as the source lattice and the other is denoted as the target lattice. As mentioned above and discussed in greater detail below, a form of the Hungarian/Munkres' assignment algorithm is employed to find the minimum total cost.

FIGS. 6a and 6b illustrate two crisp (i.e. non-fuzzy) lattices of the type which are generated by the lattice generation module 134 when using non-fuzzy data to construct a lattice using FCQ techniques as described above, in the sense that each node comprises a different set of members and the object of the difference determination algorithm is to identify a way of changing each node from the source lattice into a node from the target lattice using only insertion deletion and replacement/substitution steps, using the minimum total number of such steps.

As can be seen in FIG. 6a, the lattice of FIG. 6a has 10 nodes altogether three of which are empty nodes (i.e. they contain no members). If we write an empty node as { } then the lattice of FIG. 6a has 8 distinct nodes which we can write as:

abc/abd/ab/ac/a/bd/c/{ }

Similarly, the nodes of FIG. 6b can be written as:

abcd/a/bcd/bc/bd/cd/c/d/{ }

As was done above, a table is generated in which rows of the table are labeled with source sets (i.e. sets corresponding to the nodes of the source lattice shown in FIG. 6a) and columns are labeled with target sets. Note that the source also contains an empty set to make the table square (since the specific algorithm employed in the lattice difference determination module of the present embodiment requires this). The sets are listed along the row and column headings in a fixed order (in the present embodiment the sets are listed using a kind of alphabetical ordering in which spaces count as coming after the last letter of the alphabet, such that bcd comes before bc and abc and abd come before ab—but other fixed orderings could be used instead); there is no need to consider sets which are in both the source and the target since they have zero cost.

Accordingly in table 5 below, nodes a, c, and bd are omitted from the table since they appear in both the source and target lattices, resulting in the following table:

TABLE 5

|  | abcd | bcd | bc | cd | d |
|---|---|---|---|---|---|
| Abc | 1 0 0 | 0 0 1 | 0 1 0 | 0 1 1 | 0 2 1 |
| Abd | 1 0 0 | 0 0 1 | 0 1 1 | 0 1 1 | 0 2 0 |
| Ab | 2 0 0 | 1 0 1 | 0 0 1 | 0 0 2 | 0 1 1 |
| Ac | 2 0 0 | 1 0 1 | 0 0 1 | 0 0 1 | 0 1 1 |
| Empty | 4 0 0 | 3 0 0 | 2 0 0 | 2 0 0 | 1 0 0 |

The Levenshtein algorithm discussed above is employed by the lattice difference determination module 134 is employed in order to identify the edit distance to be placed in each of the cells in the table as appropriate—e.g. the cell in row "Ab" and column "cd" has an edit distance of (0 0 2) since two replacements are required to convert Ab to cd and this is calculated using the Levenshtein algorithm discussed above.

TABLE 6

|  | abcd | bcd | bc | cd | d |
|---|---|---|---|---|---|
| Abc | 100 | 001 | 010 | 011 | 021 |
| Abd | 100 | 001 | 011 | 011 | 020 |
| Ab | 200 | 101 | 001 | 002 | 011 |
| Ac | 200 | 011 | 001 | 001 | 011 |
| Empty | 400 | 300 | 200 | 200 | 100 |

TABLE 7

|  | abcd | bcd | bc | cd | d |
|---|---|---|---|---|---|
| abc | 1 | 1 | 1 | 2 | 3 |
| abd | 1 | 1 | 2 | 2 | 2 |
| ab | 2 | 2 | 1 | 2 | 2 |
| ac | 2 | 2 | 1 | 1 | 2 |
| empty | 4 | 3 | 2 | 2 | 1 |

Tables 6 and 7 above indicate (with the solid and dashed highlighting) the optimum pairings in order to produce an overall minimized edit distance cost (Table 6 shows the edit costs per pair in a tuple, whilst Table 7 shows the total edit cost (=i+d+r) for each pair). Note that the dashed highlighting line indicates that the same minimum overall edit cost for the lattice transformation can be obtained with pairing abc-abcd and abd-bcd, or vice-versa—i.e. abc-bcd and abd-abcd).

By adding together the highlighted cell contents (e.g. along the main diagonal) of Table 6 we can find the total number of insertion, deletion and replacement operations, giving the distance between concept hierarchies=(2 0 3) having a total edit cost of 5 (which could also have been obtained directly from Table 7).

Note that we can also identify the changes required to convert one lattice into the other—in this example, taking the first solution we need to insert d (twice), replace a by d, and a by c (twice).

Fuzzy Edit-Cost

The above described methodology has been extended in the present embodiment in order to cover fuzzy lattices which the lattice generation module 134 may also generate.

In the case of a pair of fuzzy sets of elements, an edit cost is given as: $(i,d,r)/\mu$, where i is the number of elements to be inserted in the set S1, etc (as for the crisp case), and $\mu$ represents the membership function (the degree to which the tuple (i,d,r) represents the cost), and the total cost is given by i+d+r Notice again, either i or d or both must be zero Here we define theses two auxiliary definition of addition and subtraction by following two formulations before presenting the algorithm to compute the fuzzy edit distance:

$$(i3,d3,r3)=(i1,d1,r1)\oplus(i2,d2,r3)$$

where
i3=max(0,i1+i2−d1−d2)
d3=max(0,d1+d2−i1−i2)
r3=r1+r2+max(min(i1,d2),min(i2,d1))

$$(i3,d3,r3)=(i1,d1,r1)\ominus(i2,d2,r3)$$

where
i3=max(0,i1−i2−d1+d2)
d3=max(0,d1−d2−i1+i2)
r3=r1−r2−max(min(i2,d3),min(d2,i3))

The algorithm to find the fuzzy edit distance between two fuzzy concepts (sets) used by the lattice difference determination module 138 of certain example embodiments of the present invention is given below. The cost is represented as a fuzzy bag of edit distances; a fuzzy bag is an extension of a fuzzy set where an element may be present with different memberships.

The union operation at step 3.7 (below) operates on bags, i.e. it allows the same element to be present more than once, with different memberships.

Input: Two fuzzy sets, S and T
Output: Fuzzy Edit Cost
1. (Step 1) pre-process the fuzzy sets and create their intersection:
  1.1. remove any element that is in both S and T with the same membership
  1.2. find the intersection of S and T
  1.3. reorder the intersection and new S and T by decreasing membership
2. (Step 2) let L be the set of membership levels in S, T and the intersection in decreasing order
3. (Step 3) create the fuzzy cost
  3.1. initialize cost to empty set and accumulated cost to (0 0 0)
  3.2. for each membership level m in L (NB addition and subtraction as defined previously)
    3.2.1. add (0 1 0) to accumulated cost for each element in S with membership m that is not also in the intersection with membership m
    3.2.2. add (1 0 0) to accumulated cost for each element in T with membership m that is not also in the intersection with membership m
    3.2.3. subtract (0 1 0) from the accumulated cost for each element in T with membership m that is also in the intersection with membership m
    3.2.4. subtract (1 0 0) from the accumulated cost for each element in S with membership m that is also in the intersection with membership m
    3.2.5. cost=cost∪{accumulated cost/m}
  3.3. endfor
4. (Step 4) return cost Note that the "intersection" as used above, means the smaller membership value of an element where the same element appears in both sets but with different membership values. For example if one set contains a member f with membership value 0.7 and another set contains member f with membership value 0.3 the intersection of these sets would contain f with membership 0.3.

EXAMPLE $S=\{a/1,b/1,c/0.2,d/0.5,e/0.8,f/0.7,h/0.7\}$ $T=\{a/1,c/1,d/0.5,f/0.3,g/0.3\}$

Step 1

$S=\{b/1,e/0.8,f/0.7,h/0.7,c/0.2\}$ $T=\{c/1,f/0.3,g/0.3\}$ intersection=$\{c/0.2,f/0.3\}$ Step 2

$L=\{1,0.8,0.7,0.3,0.2\}$

Step 3 cost={ } accumulated cost=(0 0 0)

Step 3.2

$m=1$ accumulated=(0 0 0)+(0 1 0)+(1 0 0)=(0 0 1)

cost={(0 0 1)/1}

$m=0.8$ accumulated=(0 0 1)+(0 1 0)=(0 1 1)

cost={(0 0 1)/1,(0 1 1)/0.8}

$m=0.7$ accumulated=(0 1 1)+(0 2 0)=(0 3 1)

cost={(0 0 1)/1,(0 1 1)/0.8,(0 3 1)/0.7}

$m=0.3$ accumulated=(0 3 1)−(0 1 0)+(1 0 0)=(0 1 2)

cost={(0 0 1)/1,(0 1 1)/0.8,(0 3 1)/0.7,(0 1 2)/0.3}

$m=0.2$ accumulated=(0 1 2)−(1 0 0)=(0 2 1)

cost={(0 0 1)/1,(0 1 1)/0.8,(0 3 1)/0.7,(0 1 2)/0.3,(0 2 1)/0.2}

Fuzzy Lattice Edit Cost

Now we can construct a cost matrix where each element is a fuzzy multiset (bag) of costs.

Consider two fuzzy lattices (FIGS. 7a and 7b). Table 8 below shows the table formed by calculating the fuzzy edit distance according to the algorithm presented above for each pair of fuzzy sets as set out along the row and column labels. Note that we have included in this table the fuzzy set comprising just (a 0.4) despite the fact that it appears in both the source and target lattice. This was however unnecessary since, as mentioned above, there is zero cost in such a transformation and so it could have been omitted.

TABLE 8

The fuzzy edit distances between each pair of nodes is as shown in this table.

| | ((d 0.9) (b 0.8) (a 0.6) (c 0.5)) | ((b 0.7) (d 0.6) (c 0.5)) | ((b 0.6) (d 0.5)) | ((b 0.5) (c 0.5)) | ((d 0.6) (c 0.5)) | ((a 0.4)) | ((c 0.4)) | ((d 0.4)) |
|---|---|---|---|---|---|---|---|---|
| (( b 1) (c 0.8) (a 0.5)) | (((1 0 0) 0.5) ((1 0 1) 0.6) ((0 0 1) 0.8) ((0 0 1) 0.9) ((0 1 0) 1)) | (((0 0 1) 0.5) ((0 0 1) 0.6) ((0 1 0) 0.7) ((0 2 0) 0.8) ((0 1 0) 1)) | (((0 1 1) 0.5) ((0 1 0) 0.6) ((0 2 0) 0.8) ((0 1 0) 1)) | (((0 1 0) 0.5) ((0 2 0) 0.8) ((0 1 0) 1)) | (((0 1 1) 0.5) ((0 1 1) 0.6) ((0 2 0) 0.8) ((0 1 0) 1)) | (((0 2 0) 0.4) ((0 3 0) 0.5) ((0 2 0) 0.8) ((0 1 0) 1)) | (((0 2 0) 0.4) ((0 3 0) 0.5) ((0 2 0) 0.8) ((0 1 0) 1)) | (((0 2 1) 0.4 ((0 3 0) 0.5) ((0 2 0) 0.8) ((0 1 0) 1)) |
| ((b 0.8) (a 0.6) (d 0.3)) | (((1 0 0) 0.3) ((2 0 0) 0.5) ((1 0 0) 0.9)) | (((0 0 1) 0.3) ((1 01) 0.5) ((0 01) 0.6) ((0 0 0) 0.7) ((0 1 0) 0.8)) | (((0 1 0) 0.3) ((0 0 1) 0.5) ((0 1 0) 0.6) ((0 1 0) 0.8)) | (((0 1 1) 0.3) ((0 0 1) 0.5) ((0 2 0) 0.6) ((0 1 0) 0.8)) | (((0 1 1) 0.3) ((0 0 2) 0.5) ((0 1 1) 0.6) ((0 1 0) 0.8)) | (((0 2 0) 0.3) ((0 1 0) 0.4) ((0 2 0) 0.6) ((0 1 0) 0.8)) | (((0 2 1) 0.3) ((0 1 1) 0.4) ((0 2 0) 0.6) ((0 1 0) 0.8)) | (((0 2 0) 0.3) ((0 1 1) 0.4) ((0 2 0) 0.6) ((0 1 0) 0.8)) |
| ((c 0.6) | (((2 0 0) 0.4) | (((1 0 1) 0.4) | (((0 0 2) 0.4) | (((0 0 1) 0.4) | (((0 0 1) 0.4) | (((0 1 0) 0.6)) | (((0 1 0) 0.4) | (((01 1) 0.4) |

TABLE 8-continued

The fuzzy edit distances between each pair of nodes is as shown in this table.

|  | ((d 0.9) (b 0.8) (a 0.6) (c 0.5)) | ((b 0.7) (d 0.6) (c 0.5)) | ((b 0.6) (d 0.5)) | ((b 0.5) (c 0.5)) | ((d 0.6) (c 0.5)) | ((a 0.4)) | ((c 0.4)) | ((d 0.4)) |
|---|---|---|---|---|---|---|---|---|
| (a 0.4)) | ((3 0 0) 0.5) ((2 0 1) 0.6) ((2 0 0) 0.8) ((1 0 0) 0.9)) | ((2 0 0) 0.5) ((1 01) 0.6) ((1 0 0) 0.7)) | ((1 0 1) 0.5) ((0 0 1) 0.6)) | ((1 0 0) 0.5) ((0 1 0) 0.6)) | ((1 0 0) 0.5) ((0 0 1) 0.6)) |  | ((0 1 0) 0.6)) | ((0 1 0) 0.6)) |
| ((b 0.7) (a 0.4)) | (((2 0 0) 0.4) ((3 0 0) 0.5) ((2 0 0) 0.6) ((1 0 0) 0.7) ((2 0 0) 0.8) ((1 0 0) 0.9)) | (((1 0 1) 0.4) ((2 0 0) 0.5) ((1 0 0) 0.6)) | (((0 0 1) 0.4) ((1 0 0) 0.5) ((0 0 0) 0.6) ((0 1 0) 0.7)) | (((0 0 1) 0.4) ((1 0 0) 0.5) ((0 1 0) 0.7)) ((0 1 0) 0.7)) | (((0 0 2) 0.4) ((1 0 1) 0.5) ((0 0 1) 0.6) | (((0 1 0) 0.7)) | (((0 1 1) 0.4) ((0 1 0) 0.7)) | (((0 1 1) 0.4) ((0 1 0) 0.7)) |
| ((b 0.8) (d 0.3)) | (((2 0 0) 0.3) ((3 0 0) 0.5) ((2 0 0) 0.6) ((1 0 0) 0.9)) | (((1 0 0) 0.3) ((2 0 0) 0.5) ((1 0 0) 0.6) ((0 0 0) 0.7) ((0 1 0) 0.8)) | (((0 0 0) 0.3) ((1 0 0) 0.5) ((0 0 0) 0.6) ((0 1 0) 0.8)) | (((0 0 1) 0.3) ((1 0 0) 0.5) ((0 1 0) 0.8)) | (((0 0 1) 0.3) ((1 0 1) 0.5) ((0 0 1) 0.6) ((0 1 0) 0.8)) | (((0 1 1) 0.3) ((0 0 1) 0.4) ((0 1 0) 0.8)) | (((0 1 1) 0.3) ((0 0 1) 0.4) ((0 1 0) 0.8)) | (((0 1 0) 0.3) ((0 0 1) 0.4) ((0 1 0) 0.8)) |
| ((c 0.5)) | (((3 0 0) 0.6) ((2 0 0) 0.8) ((1 0 0) 0.9)) | (((2 0 0) 0.6) ((1 0 0) 0.7)) | (((1 0 1) 0.5) ((1 0 0) 0.6)) | (((1 0 0) 0.5)) | (((1 0 0) 0.6) | (((0 0 1) 0.4) ((0 1 0) 0.5)) | (((0 0 0) 0.4) ((0 1 0) 0.5)) | (((0 0 1) 0.4) ((0 1 0) 0.5)) |
| ((a 0.4)) | (((3 0 0) 0.4) ((4 0 0) 0.5) ((3 0 0) 0.6) ((2 0 0) 0.8) ((1 0 0) 0.9)) | (((2 0 1) 0.4) ((3 0 0) 0.5) ((2 0 0) 0.6) ((1 0 0) 0.7)) | (((1 0 1) 0.4) ((2 0 0) 0.5) ((1 0 0) 0.6)) | (((1 0 1) 0.4) ((2 0 0) 0.5)) ((1 0 0) 0.6)) | (((1 0 1) 0.4) ((2 0 0) 0.5) ((1 0 0) 0.6) | identical sets | (((0 0 1) 0.4)) | (((0 0 1) 0.4) |

To apply the assignment algorithm the lattice difference determination module 138 needs to be able to compare different fuzzy multisets within a row or column, and to subtract the minimum cost from others in the row/column.

This requires a total ordering over costs. There is no unique ordering for the fuzzy costs used here.

One way to convert this fuzzy cost matrix into a form suitable for the assignment algorithm is to replace each fuzzy cost by an expected value. This requires that the fuzzy memberships are treated using mass assignment theory in which the membership level of an element is related to the probability mass that can be assigned to that element. In this interpretation, a fuzzy set corresponds to a family of probability distributions over the elements or (equivalently) to a probability distribution over the power set of elements.

In this case, we are interested only in comparing costs not in finding their absolute values. Hence we can use the simplest computational method to determine an ordering over fuzzy costs.

Considering the cost $$\{(0\ 1\ 1)/0.5, (0\ 1\ 1)/0.6, (0\ 2\ 0)/0.8, (0\ 1\ 0)/1\}$$

which we re-write as a mass assignment $\{(0\ 1\ 0)\}$: 0.2 (=1−0.8—i.e. the membership of the cost with the highest membership value minus the membership of the cost with the next highest membership value)

$\{(0\ 2\ 0), (0\ 1\ 0)\}$: 0.2 (=0.8−0.6—i.e. the membership of the cost with the second highest membership minus the membership of the cost with the third highest membership)

$\{(0\ 1\ 1), (0\ 2\ 0), (0\ 1\ 0)\}$: 0.1 (=0.6−0.5—i.e. the membership of the cost with the third highest membership minus the membership of the cost with the fourth highest (which in this case is also the lowest) membership)

$\{(0\ 1\ 1), (0\ 1\ 1), (0\ 2\ 0), (0\ 1\ 0)\}$: 0.5 (=0.5−0—i.e. the membership of the cost with the lowest membership)

Note that the sets are nested, i.e. if we write the mass assignment as $M=S_i$: $m_i$ then $S_i$ is a subset of $S_{i+1}$ The mass on any set can be shared amongst its elements—so that, for example $$\{(0\ 2\ 0), (0\ 1\ 0)\} : 0.2$$

has a mass of 0.2 that could be split equally with 0.1 to each of (0 2 0) and (0 1 0), or it could all be given to (0 2 0), etc. The equal split is referred to as the least prejudiced distribution. In the method described here we assign the mass on a set $S_{i+1}$ to the elements that are not present in the set $S_i$ Using the example above, we would assign the mass as follows $$\{(0\ 1\ 0)\} : 0.2\ (=1-0.8)$$

$$\{(0\ 2\ 0)\} : 0.2\ (=0.8-0.6)$$

$$\{(0\ 1\ 1)\} : 0.1\ (=0.6-0.5)$$

$$\{(0\ 1\ 1)\} : 0.5\ (=0.5-0)$$

This corresponds to an extreme of the possible distributions, but is a fast method and is adequate since we are only interested in the relative values of the edit costs.

Given that we now have a distribution over costs, the lattice difference determination module 138 can find an expected value by taking the total cost.

Conversion of Fuzzy Multiset of Costs to a Point Value

Once a mapping between lattices has been found, it is possible to obtain a fuzzy total cost by adding the appropriate costs from the table.

Method

1 Create a table in which each row corresponds to a fuzzy set from the source lattice S and each column to a fuzzy set from the target lattice T. List fuzzy sets in a fixed order (e.g. alphabetically); there is no need to consider sets which are in both the source and the target since they have zero cost.

2 For each cell (row r, column c), calculate the fuzzy edit cost (as above) and list the elements of the cost in increasing membership order. We will refer to these costs as $(i_1\ d_1\ r_1)$ with membership $\mu_1$ etc.

2.1 Set the accumulated cost to $(i_1+d_1+r_1) \times \mu_1$
2.2 for each remaining element of the fuzzy edit cost, $(i_j d_j r_j)$ with membership $\mu_j$,
  add $(i_j d_j r_j) \times (\mu_j - \mu_{j-1})$ to the accumulated cost
2.3 Fill cell (r, c) with the accumulated cost,
3 Apply the assignment algorithm to find the mapping (Si→Tj) between source and target lattices that leads to minimum total cost.

If required, the fuzzy total cost can be obtained by recalculating the appropriate fuzzy edit costs between the relevant pairs of fuzzy sets.

Example

The expected costs from table 8 above are:

TABLE 9

|  | ((d 0.9) (b 0.8) (a 0.6) (c 0.5)) | ((b 0.7) (d 0.6) (c 0.5)) | ((b 0.6) (d 0.5)) | ((b 0.5) (c 0.5)) | ((d 0.6) (c 0.5)) | ((a 0.4)) | ((c 0.4)) | ((d 0.4)) |
|---|---|---|---|---|---|---|---|---|
| ((b 1) (c 0.8) (a 0.5)) | 1.1 | 1.1 | 1.7 | 1.3 | 1.8 | 1.9 | 1.9 | 2.3 |
| ((b 0.8) (a 0.6) (d 0.3)) | 1.1 | 0.9 | 0.8 | 1.2 | 1.4 | 1.3 | 1.7 | 1.4 |
| ((c 0.6) (a 0.4)) | 1.9 | 1.3 | 1.1 | 0.6 | 0.6 | 0.6 | 0.6 | 1.0 |
| ((b 0.7) (a 0.4)) | 1.7 | 1.1 | 0.6 | 0.7 | 1.2 | 0.7 | 1.1 | 1.1 |
| ((b 0.8) (d 0.3)) | 1.7 | 0.9 | 0.4 | 0.8 | 1.0 | 1.1 | 1.1 | 0.8 |
| ((c 0.5)) | 2.3 | 1.3 | 1.1 | 0.5 | 0.6 | 0.5 | 0.1 | 0.5 |
| ((a 0.4)) | 2.4 | 1.8 | 1.1 | 1.0 | 1.1 | 0.0 | 0.4 | 0.4 |
| empty |  |  |  |  |  |  |  | 0.4 | so that the mapping is {b/1, c/0.8, a/0.5}→{d/0.9, b/0.8, a/0.6, c/0.5} etc as indicated by the highlighting in Table 9 above. The total cost is 4.2.

Note that the row and column labeled {a/0.4} would be omitted as the same set is present in source and target.

Document Tagging Example

Having presented above a description of the operation of the lattice difference determination module 138, the description now returns to considering a specific example of tagging on a set of documents and how the tags are converted into a table of fuzzy sets which can then be converted into a lattice representation using FCA and which can then be recalculated at different times such that differences between the lattices over time can be measured and thus a level of draft detected.

As mentioned above, the present embodiment permits tags to be applied to documents by users and these tags are then stored, along with a record of the relevant user and document. The system then allows users to search via tags for previously tagged documents.

In this system the tags which different users associate with a set of information objects as they use the system are captured in a database. A three dimensional matrix (which represents the folksonomy) is generated whose 3 axes are: a set of information objects D, a set of users, U, and a set of tags, T.

$$M3 = <D, U, T>$$

then M3(d,u,t)=1 if and only if user u tagged information object d with tag t.

In the present embodiment, this matrix is further processed by conflating tags which are synonyms or variants of the same word "compute/computer/computing"). Synonyms can be identified by using a thesaurus such as WordNet. Tags can be reduced to their root form using a stemming algorithm, such as Porter's.

In order to apply fuzzy FCA (as explained above), a process is used in which the more users have associated a tag with a given information object the greater the weight which is put on the linkage between that tag and object.

Thus, if U is the total number of users and u is the number of users who associated tag t with object d then the weight of association between d and t can be calculated as:

$$M2(d,t) = u/U.$$

The weighting in the present embodiment is also adjusted to take into account the 'rarity' of the tag with respect to the number of documents with which it is associated. This is done in the present embodiment by calculating for each tag the inverse document frequency (idf): if d is the number of documents in which tag t occurs and D is the total number of documents, then $$idf(t) = \log(D/d)$$

and now $$M2(d,t) = u/U * idf(t)$$

Thus the 3-dimensional folksonomic matrix M3 is reduced to a 2-dimensional folksonomic matrix, as exemplified in the table below:

TABLE 10

|    | Mobile | Wireless | Internet | Web | KM  | Comm | ST  | BI | TA  | OM  | ML  | KD  | OL  | RDF | OWL |
|----|--------|----------|----------|-----|-----|------|-----|----|-----|-----|-----|-----|-----|-----|-----|
| D1 | 1      | 0.8      | 0.6      | 0.4 | 0   | 0    | 0   | 0  | 0   | 0   | 0   | 0   | 0   | 0   | 0   |
| D2 | 0      | 0        | 0        | 0   | 1   | 0.8  | 0.6 | 0  | 0   | 0   | 0   | 0   | 0   | 0   | 0   |
| D3 | 0      | 0        | 0        | 0   | 0   | 0    | 0.8 | 1  | 0.9 | 0   | 0   | 0   | 0   | 0   | 0   |
| D4 | 0      | 0        | 0        | 0   | 0   | 0    | 0.7 | 0  | 0   | 1   | 0   | 0   | 0.6 | 0.7 | 0.7 |
| D5 | 0      | 0        | 0        | 0   | 0   | 0    | 0   | 0  | 0   | 0   | 0.7 | 1   | 0.8 | 0.6 | 0   |
| D6 | 0.7    | 1        | 0.7      | 0   | 0   | 0    | 0   | 0  | 0   | 0   | 0   | 0   | 0   | 0   | 0   |
| D7 | 0      | 0        | 0        | 0   | 0.8 | 1    | 0.8 | 0  | 0   | 0   | 0   | 0   | 0   | 0   | 0   |
| D8 | 0      | 0        | 0        | 0   | 0   | 0    | 0   | 0  | 0   | 0.8 | 0.6 | 0.6 | 1   | 0   | 0.7 |
| D9 | 0      | 0        | 0        | 0   | 0   | 0    | 0.7 | 10 | 0.8 | 0   | 0   | 0   | 0   | 0   | 0   |

In this table D1 to D9 represent documents which have been tagged by users with any one or more of the tags Mobile, Wireless, Internet, Web, KM (=Knowledge Management), Comm (=Community), ST (=Semantic Technology), BI (=Business Intelligence), TA (=Text Analytics), OM (=Ontology Management), ML (=Machine Learning), KD (=Knowledge Discovery), OL (=Ontology Learning), RDF (=Resource Description Framework) and OWL (=Web Ontology Language). The membership values are fuzzy and have been calculated in accordance with the method described above.

Taxonomy Extraction

Figure 8A:
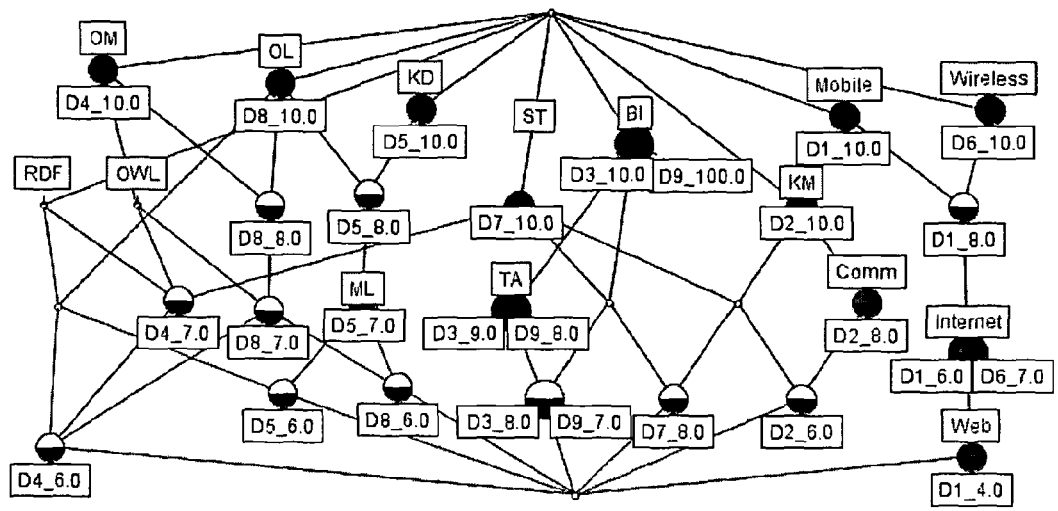
FIGS. 8a and 8b are schematic illustrations of example fuzzy lattices formed from tag data applied to a set of documents.

In order to capture the inter-relationships between data (i.e. to show how each entry relates to the other entries) the lattice generation module 134 uses FCA or, in particular, in this case, fuzzy FCA as described above. These inter-relationships are be represented as a lattice—representing a taxonomy of concepts within the system's universe of discourse i.e. the fuzzy table 10 above. The resulting lattice representation is depicted in FIG. 8a.

Each node on the graph represents a concept (a packaging of some objects/members—i.e. documents—and some attributes—tags) e.g. the node with the label KM and D2/1.0 represents a concept with objects D2/1.0, D2/0.8, D2/0.6 and D7/0.8. This means only the above mentioned list of documents (i.e. D2 and D7) have been tagged by KM. Furthermore, D2's membership level with KM is 1.0 and yet it has membership levels of 1.0, 0.8 and 0.6 associated with the node. This is because member D2 has membership levels of 0.8 and 0.6 with other attributes, and since these membership levels are less than the membership level of D2 with the attribute in question, they are included in this fuzzy concept.

Over time, the tags associated with information objects and the set of information objects tagged will change (enrich) as users use the system. Continuing our example, the 2-d matrix M2 may now appear as shown in Table 11 below.

Figure 8B:
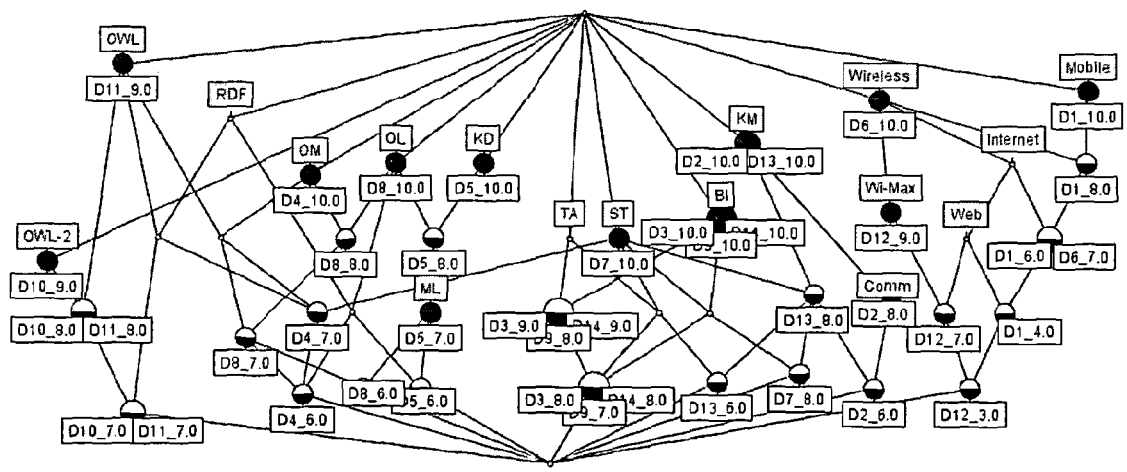

This table yields a different relationship graph (taxonomy)—see FIG. 8b.

Now a new concept with new attribute 'OWL2' has D10/0.9, D10/0.8, D11/0.8, D10/0.7 and D11/0.7 as its objects i.e. this new object set contains the only Documents which have been tagged by 'OWL2'. We can see that the concept represented by tag 'OWL2' is closely linked to 'OWL' and 'RDF', while another new tag 'Wi-Max' is closely linked to 'Wireless'. Furthermore, the new contributions to the database have strengthened the link between 'TA' (text analytics) and 'ST' (semantic technology).

Graph Comparison

Looking at the two graphs generated from the user data at 2 points in time it is easy to see how new concepts have emerged and how the relationships between concepts as perceived by the users has changed over time. One of the biggest problems with taxonomic or ontological representations is their failure to easily be updated as user conceptualizations change. In the approach presented here, however, the changing views of the users can be automatically derived at any time based on actual user behavior—the tags they are using.

Furthermore, the present inventor has developed a way of measuring the drift between two lattices which can be used to compare extracted structures with hand-crafted taxonomies, classification hierarchies or ontologies created by domain experts. This highlights how the formal taxonomy, classification hierarchy or ontology differs from the users' conceptualization of the domain as revealed by their tagging activity and can be used as a useful source of proposed improvements to the hand-crafted taxonomy, classification hierarchy or ontology.

TABLE 11

|     | Mobile | Wireless | Internet | Web | KM | Comm | ST  | BI | TA  | OM  | ML  | KD  | OL  | RDF | OWL | OWL-2 | Wi-Max |
|-----|--------|----------|----------|-----|----|------|-----|----|-----|-----|-----|-----|-----|-----|-----|-------|--------|
| D1  | 1      | 0.8      | 0.6      | 0.4 | 0  | 0    | 0   | 0  | 0   | 0   | 0   | 0   | 0   | 0   | 0   | 0     | 0      |
| D2  | 0      | 0        | 0        | 0   | 1  | 0.8  | 0.6 | 0  | 0   | 0   | 0   | 0   | 0   | 0   | 0   | 0     | 0      |
| D3  | 0      | 0        | 0        | 0   | 0  | 0    | 0.8 | 1  | 0.9 | 0   | 0   | 0   | 0   | 0   | 0   | 0     | 0      |
| D4  | 0      | 0        | 0        | 0   | 0  | 0    | 0.7 | 0  | 0   | 1   | 0   | 0   | 0.6 | 0.7 | 0.7 | 0     | 0      |
| D5  | 0      | 0        | 0        | 0   | 0  | 0    | 0   | 0  | 0   | 0   | 0.7 | 1   | 0.8 | 0.6 | 0   | 0     | 0      |
| D6  | 0.7    | 1        | 0.7      | 0   | 0  | 0    | 0   | 0  | 0   | 0   | 0   | 0   | 0   | 0   | 0   | 0     | 0      |
| D7  | 0      | 0        | 0        | 0   | 0.8| 1    | 0.8 | 0  | 0   | 0   | 0   | 0   | 0   | 0   | 0   | 0     | 0      |
| D8  | 0      | 0        | 0        | 0   | 0  | 0    | 0   | 0  | 0   | 0.8 | 0.6 | 0.6 | 1   | 0   | 0.7 | 0     | 0      |
| D9  | 0      | 0        | 0        | 0   | 0  | 0    | 0.7 | 1  | 0.8 | 0   | 0   | 0   | 0   | 0   | 0   | 0     | 0      |
| D10 | 0      | 0        | 0        | 0   | 0  | 0    | 0   | 0  | 0   | 0   | 0   | 0   | 0   | 0.7 | 0.8 | 0.9   | 0      |
| D11 | 0      | 0        | 0        | 0   | 0  | 0    | 0   | 0  | 0   | 0   | 0   | 0   | 0   | 0.7 | 0.9 | 0.8   | 0      |
| D12 | 0.3    | 0.9      | 0.7      | 0.7 | 0  | 0    | 0   | 0  | 0   | 0   | 0   | 0   | 0   | 0   | 0   | 0     | 0.9    |
| D13 | 0      | 0        | 0        | 0   | 1  | 0    | 0.8 | 0  | 0.6 | 0   | 0   | 0   | 0   | 0   | 0   | 0     | 0      |
| D14 | 0      | 0        | 0        | 0   | 0  | 0    | 0.8 | 1  | 0.9 | 0   | 0   | 0   | 0   | 0   | 0   | 0     | 0      |

Second Embodiment

Database Analysis Tool

Figure 9:
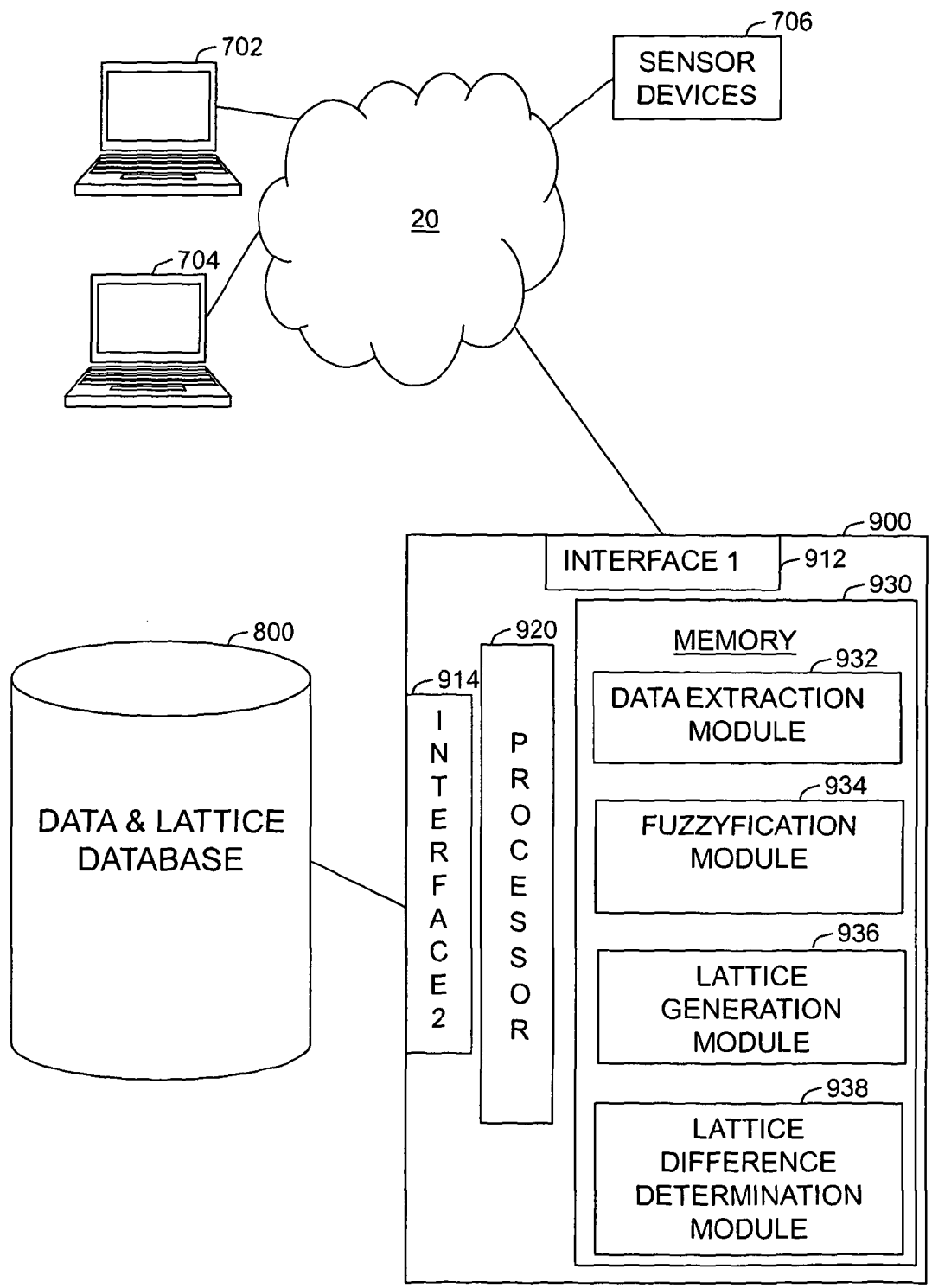
FIG. 9 is a database system according to a second embodiment of the present invention.

FIG. 9 shows a second embodiment of the present invention which aims to provide an analysis tool for databases. The system comprises some user computers 702, 704 and some sensor devices 706 which are connected to the Internet 20; also connected to the Internet 20 is a database analysis system 900, which has a connection to a (computerized) database system 800.

The database analysis system 900 comprises a first interface 912 via which the system 900 is connected to the Internet 20 and a second interface 914 via which the system 900 is connected to the data and lattice database system 800. The system also includes a processor (and associated electronics) 920 and a memory 930. As is well known, the memory contains data, etc. required by the processor to operate, as well as computer program code for controlling the operation of the processor. In addition to a number of standard programs (e.g. an operating system) which are not described here since they are not pertinent to certain example embodiments of the present invention, the memory also includes the following computer program code modules which are responsible for causing the system to carry out various functions which are pertinent to certain example embodiments of the present invention. These more pertinent modules are a data extraction module 932, a fuzzyfication module 934, a lattice generation module 936 and a lattice difference determination module 938.

The data extraction module 932 is responsible for enabling the system 900 to act as a gateway to the user computers and sensor devices 702-706. Thus the system 900, under the control of the data extraction module 932, is operable to receive data from one of the user computers or the sensor devices and to store this into the database 800.

The fuzzyfication module 934 is then responsible for taking this data and representing it as a set of fuzzy data and compiling the data into one or more tables having members as labels of the rows of the tables and attributes as labels of the columns of the table and the cells containing the membership level (between 0 and 1) of the respective member to the respective attribute. An example of how this may be done is given below.

The lattice generation module 936 is responsible for causing the system 900 to take fuzzy data from the Database 800 generated by the fuzzyfication module 934 and to convert this data into a lattice representation using Formal Concept Analysis (FCA) techniques. This is done in the same way as described above in respect of the first embodiment. Having processed the fuzzy table data to generate a lattice representation, this lattice representation data is then stored in the Database 800 for future use. The system may delete old lattice representations if it deems that they are no longer necessary in order to save space in the Database 800.

The lattice difference determination module 938 is responsible for controlling the system 100 to determine a difference between two lattices. The operation of this module is the same as that of the lattice difference determination module 138 of the first embodiment.

Table 12 below represents a segment of such a database describing various buildings in a business park and their security concerns (values in this example are all fictitious).

Note: number of patrols is correlated to the number of doors, windows, previous security incidents, CCTV etc.

TABLE 12

|  | doors | incident | CCTV | patrol | windows |
|---|---|---|---|---|---|
| Orion | 5 | 18 | 4 | 12 | 150 |
| Pegasus | 10 | 3 | 20 | 2 | 200 |
| Aquarius | 12 | 4 | 18 | 1 | 140 |
| Hub | 2 | 17 | 5 | 15 | 40 |
| B65 | 15 | 2 | 14 | 3 | 40 |
| Columba | 2 | 20 | 4 | 11 | 110 |
| Callisto | 2 | 7 | 15 | 2 | 30 |

Fuzzification

For each attribute (column) in the table we used a membership function of the form $\mu_o: X \rightarrow [0,1]$ that is, for each element $X \in O$ of objects (the set {Orion, Pegasus, Aquarius, Hub, B65, Columba, Callisto}), can be mapped to a value in the real range [0,1] using function such as the one given below. Below we present a function for "previous incident", however, the others would be similar functions.

Let x be number of previous incident, consider the following membership function:

$$\mu_o(x) = \begin{cases} 0 & x \leq 2 \\ \frac{x}{10} & 2 < x < 10 \\ 1 & x \geq 10 \end{cases}$$

In this manner we can convert the table to a fuzzy table

TABLE 13

|  | doors | incident | CCTV | patrol | windows |
|---|---|---|---|---|---|
| Orion | 0.3 | 0.8 | 0 | 1 | 1 |
| Pegasus | 0.7 | 0 | 1 | 0.3 | 1 |
| Aquarius | 0.8 | 0 | 0.9 | 0 | 0.8 |
| Hub | 0 | 0.9 | 0 | 1 | 0 |
| B65 | 1 | 0 | 0.8 | 0 | 0.3 |
| Columba | 0 | 1 | 0 | 0.9 | 0.9 |
| Callisto | 0.3 | 0.3 | 0.9 | 0.3 | 0 |

Taxonomy Extraction

In order to capture the inter-relationships between data (i.e. to show that how each entry relates to the other entries we use FCA or in this case fuzzy FCA as described above in relation to the first embodiment). These inter-relationships can be depicted as a lattice (a special form of graph)—representing a taxonomy of concepts within our universe of discourse i.e. the fuzzy table above as shown in FIG. 10a.

How to Read the Graph

Figure 10A:
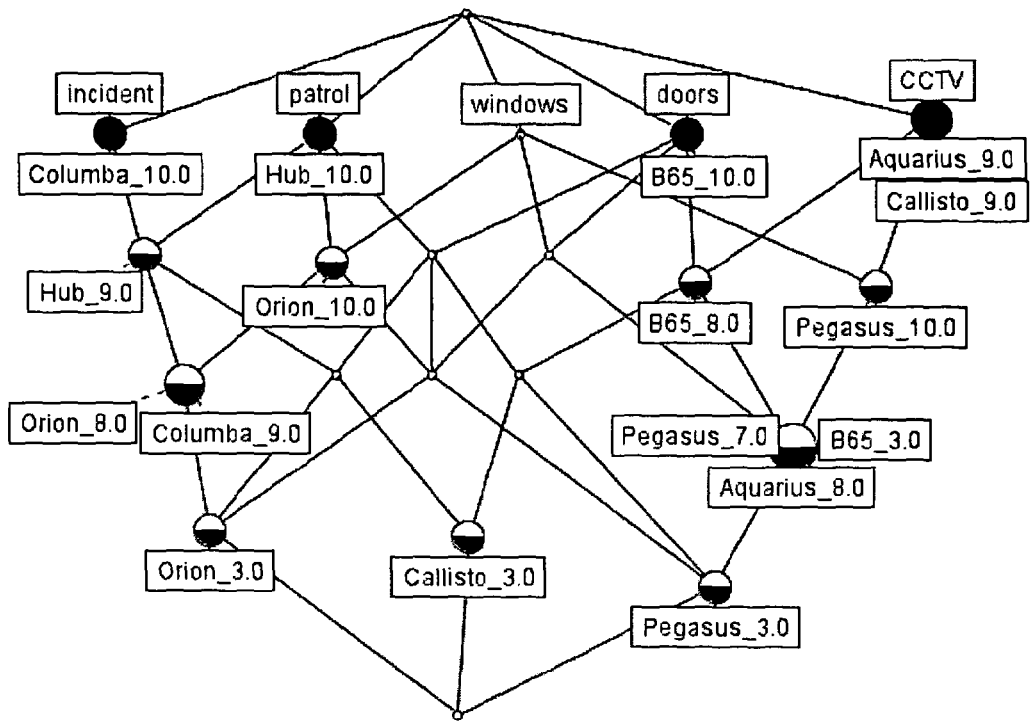
FIGS. 10a and 10b are schematic illustrations of example fuzzy lattices generated and compared by a database system according to a second embodiment of the present invention.

Each node on the graph/lattice of FIG. 10a represents a concept (a packaging of some object i.e. building and some attributes) e.g. the node with the label Hub_9.0 represents a concept with objects Hub/0.9, Orion/0.8, Columba/0.9, Orion/0.3 and Callisto/0.3 while its attributes are incident and patrol. This means that only the above mentioned list of members (i.e. buildings) had both patrols and also security incidents.

Over time using same membership functions we may get a different table (table 3)—or we might have an ideal table/graph (within some criteria) in mind.

TABLE 3

|  | doors | incident | CCTV | patrol | Windows |
|---|---|---|---|---|---|
| Orion | 0.3 | 0.7 | 0 | 1 | 1 |
| Pegasus | 0.7 | 0 | 1 | 0 | 1 |

TABLE 3-continued

|  | doors | incident | CCTV | patrol | Windows |
|---|---|---|---|---|---|
| Aquarius | 0.8 | 0 | 0.9 | 0 | 0.8 |
| Hub | 0 | 0.7 | 1 | 1 | 0 |
| B65 | 1 | 0 | 0.8 | 0 | 0.3 |
| Columba | 0 | 1 | 0 | 0.7 | 0.9 |
| Callisto | 0.3 | 0 | 1 | 0 | 0 |

Figure 10B:
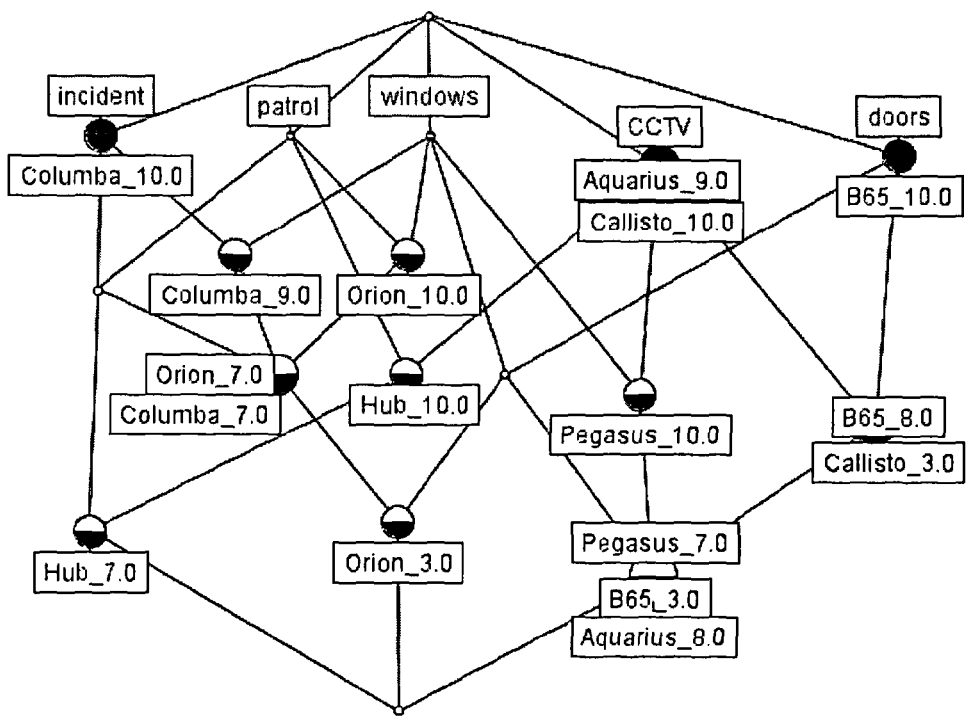

This table would yield a different relationship graph (taxonomy)—see FIG. 10b.

Now the concept with attributes incident and patrol have Orion/0.7, Columba/0.7, Hub/0.7 and Orion/0.3 as its objects i.e. these new object sets contain the only buildings which have both patrols and security incidents.

Graph Comparison

Looking at the two tables it is easy to see how the values of individual cells have been changed, or even what effect locally it has on some other values e.g. investment in security of a building might reduce security incident in that building. However, as mentioned above, there are inter-relationships between the values and a simple comparison does not reveal the global effect of these changes. The system needs to be considered as a form of ecosystem where a change in one part has a ripple effect on the ecology of the whole system and it would change the topology of the resulting graph. The present embodiment provides an analysis tool for measuring the drift between two tables of fuzzy data and thus can be used to show how complex inter-related data is changing over time.

The invention claimed is:

1. An electronic document repository system comprising:
a storage arrangement for storing a plurality of electronic documents;
tagging means for permitting users of the repository system to apply tags to the documents;
automatic tag processing means for generating a lattice representation and assigning stored documents to nodes of the lattice representation based upon the tags applied to the documents; and
a lattice representation difference determiner configured to compare two lattice representations of the type generated by the automatic tag processing means and to generate a difference value indicating an extent by which the compared lattice representations differ from one another according to an edit distance measure, wherein assignment of stored documents to nodes of the lattice is performed in dependence upon the difference value generated by the difference determiner, wherein the system is configured to generate a new lattice representation from the tagged documents in the repository system on a periodic basis and to ascertain an amount of drift of the lattice between each iteration or between a reference lattice and the lattice generated after each iteration, and wherein it is further configured to perform an action in the event that the drift exceeds some threshold criterion.

2. The electronic document repository system according to claim 1 wherein the automatic tag processing means is configured to assign, in respect of each tagged electronic document, a fuzzy membership value to each term with which the respective document has been tagged.

3. The electronic document repository system according to claim 2 wherein the automatic tag processing means is further configured to use a formal concept analysis approach to generate a lattice representation based on the fuzzy membership values assigned to the electronic documents.

4. The electronic document repository system according to claim 1 wherein, in the event that the detected drift exceeds some threshold criterion, the system is configured to generate a new lattice and reassign the stored documents to nodes of the new lattice.

5. The electronic document repository system of claim 1 wherein the edit distance measure measures the minimum number of changes required to transform one of said two lattice representations into the other, each change being one of an insertion, a deletion, or a replacement.

6. A method of storing and permitting access to electronic documents stored in an electronic repository system, the method comprising:
storing a plurality of electronic documents;
controlling the repository system to permit users of the repository system to apply tags to the documents;
generating a plurality of lattice representations;
comparing two of the lattice representations and generating a difference value indicating an extent by which the compared lattice representations differ from one another according to an edit distance measure;
assigning stored documents to nodes of one of the lattice representations based upon the tags applied to the documents and in dependence upon the generated difference value; and
generating a new lattice representation from the tagged documents in the repository system on a periodic basis and ascertaining an amount of drift of the lattice between each iteration or between a reference lattice and the lattice generated after each iteration, and performing an action in the event that the drift exceeds some threshold criterion.

7. A non-transitory computer readable storage medium tangibly storing computer processor implementable instructions for causing a computer system to carry out the method of claim 6 during execution of the instructions.

8. The method of claim 6, further comprising assigning, in respect of each tagged electronic document, a fuzzy membership value to each term with which the respective document has been tagged.

9. The method of claim 8, further comprising using a formal concept analysis approach to generate a lattice representation based on the fuzzy membership values assigned to the electronic documents.

10. The method of claim 6, wherein the edit distance measure measures the minimum number of changes required to transform one of said two lattice representations into the other, each change being one of an insertion, a deletion, or a replacement.

11. An electronic document repository system comprising:
a data store configured to store a plurality of electronic documents; and
processing resources including at least one hardware processor and a memory operatively coupled thereto, the processing resources being configured to execute functionality comprising:
controlling the repository system to permit users of the repository system to apply tags to the documents;
generating a lattice representation and assigning stored documents to nodes of the lattice representation based upon the tags applied to the documents;
comparing two lattice representations of the type generated and generating a difference value indicating an extent by which the compared lattice representations differ from one another according to an edit distance measure, wherein assignment of stored documents to nodes of the lattice is performed in dependence upon the generated difference value; and
generating a new lattice representation from the tagged documents in the repository system on a periodic basis and ascertaining an amount of drift of the lattice between each iteration or between a reference lattice and the lattice generated after each iteration, and performing an action in the event that the drift exceeds some threshold criterion.

12. The electronic document repository system according to claim 11 wherein the processing resources are configured to execute further functionality comprising assigning, in respect of each tagged electronic document, a fuzzy membership value to each term with which the respective document has been tagged.

13. The electronic document repository system according to claim 12 wherein the processing resources are configured to execute further functionality comprising using a formal concept analysis approach to generate a lattice representation based on the fuzzy membership values assigned to the electronic documents.

14. The electronic document repository system according to claim 11 wherein, in the event that the detected drift exceeds some threshold criterion, the system is configured to generate a new lattice and reassign the stored documents to nodes of the new lattice.

15. The electronic document repository system of claim 11 wherein the edit distance measure measures the minimum number of changes required to transform one of said two lattice representations into the other, each change being one of an insertion, a deletion, or a replacement.

16. An electronic document repository system comprising:
a data store configured to store a plurality of electronic documents; and
processing resources including at least one hardware processor and a memory operatively coupled thereto, the processing resources being configured to execute functionality comprising:
controlling the repository system to permit users of the repository system to apply tags to the documents;
generating a lattice representation and assigning stored documents to nodes of the lattice representation based upon the tags applied to the documents; and
comparing two lattice representations of the type generated and generating a difference value indicating an extent by which the compared lattice representations differ from one another according to an edit distance measure, wherein assignment of stored documents to nodes of the lattice is performed in dependence upon the generated difference value; and
in the event that a detected drift exceeds some threshold criterion, executing further functionality comprising generating a new lattice and reassigning the stored documents to nodes of the new lattice.

* * * * *